US009554158B2

(12) United States Patent
Knox et al.

(10) Patent No.: US 9,554,158 B2
(45) Date of Patent: Jan. 24, 2017

(54) FORMAT-AGNOSTIC STREAMING ARCHITECTURE USING AN HTTP NETWORK FOR STREAMING

(75) Inventors: Christopher R. Knox, San Diego, CA (US); Nicholas S. Brookins, San Diego, CA (US); Vaishnav Janardhan, Palo Alto, CA (US); William P. Korbe, III, Redwood Shores, CA (US); Ashok Lalwani, Redwood City, CA (US); Prasanna Laghate, Santa Clara, CA (US); Stephen L. Ludin, Mill Valley, CA (US); Akinwale O. Olugbile, San Diego, CA (US); Moses P. Pawar, Sunnyvale, CA (US); Chandan H. Rao, Karnataka (IN); Abdul Salam Faisal Padinjareveetil, San Jose, CA (US); Ronnie So, Foster City, CA (US); Babu Suryanarayanan, Foster City, CA (US)

(73) Assignee: AKAMAI TECHNOLOGIES, INC., Cambridge, MA (US)

( * ) Notice: Subject to any disclaimer, the term of this patent is extended or adjusted under 35 U.S.C. 154(b) by 0 days.

(21) Appl. No.: 13/329,057

(22) Filed: Dec. 16, 2011

(65) Prior Publication Data

US 2012/0265853 A1  Oct. 18, 2012

Related U.S. Application Data

(60) Provisional application No. 61/424,092, filed on Dec. 17, 2010, provisional application No. 61/424,482, (Continued)

(51) Int. Cl.
*G06F 15/16* (2006.01)
*H04N 7/12* (2006.01)
(Continued)

(52) U.S. Cl.
CPC ...... *H04N 21/2187* (2013.01); *H04L 65/4076* (2013.01); *H04L 65/4084* (2013.01);
(Continued)

(58) Field of Classification Search
CPC .............. H04L 65/60; H04L 65/601–65/608; H04L 65/4069; H04N 7/24; H04N 5/92; H04N 5/93
(Continued)

(56) References Cited

U.S. PATENT DOCUMENTS

| 5,138,697 A | 8/1992 | Yamamoto et al. |
| 5,305,440 A | 4/1994 | Morgan et al. |

(Continued)

FOREIGN PATENT DOCUMENTS

| CN | 101202910 A | 6/2008 |
| KR | 10-2008-0003 | 1/2008 |

(Continued)

OTHER PUBLICATIONS

U.S. Appl. No. 13/329,081, filed Dec. 11, 2011.
(Continued)

*Primary Examiner* — Viet Vu
*Assistant Examiner* — Michael A Chambers

(57) ABSTRACT

This patent document describes, among other things, distributed computer platforms for online delivery of multimedia, including HD video, at broadcast audience scale to a variety of runtime environments and client devices in both fixed line and mobile environments. The teachings hereof can be applied to deliver live and on-demand content streams via computer networks. The teachings also relate to the ingestion of content streams in a given source format and the serving of the stream in a given target format. For example, a system might have machines in a content delivery network that ingest live streams in a source format, use
(Continued)

an intermediate format to transport the stream within the system, and output the stream in a target format to clients that have requested (e.g., with an HTTP request) the stream. The streams may be archived for later playback.

24 Claims, 10 Drawing Sheets

Related U.S. Application Data filed on Dec. 17, 2010, provisional application No. 61/424,112, filed on Dec. 17, 2010, provisional application No. 61/555,378, filed on Nov. 3, 2011.

(51) Int. Cl.
    *H04N 21/2187*     (2011.01)
    *H04N 21/231*     (2011.01)
    *H04N 21/2343*     (2011.01)
    *H04N 21/258*     (2011.01)
    *H04N 21/845*     (2011.01)
    *H04L 29/06*     (2006.01)

(52) U.S. Cl.
    CPC .......... *H04L 65/605* (2013.01); *H04L 65/607* (2013.01); *H04N 21/2343* (2013.01); *H04N 21/23106* (2013.01); *H04N 21/25825* (2013.01); *H04N 21/8456* (2013.01)

(58) Field of Classification Search
    USPC .............................. 709/203, 231; 375/240.12
    See application file for complete search history.

(56) References Cited

U.S. PATENT DOCUMENTS

| | | | |
|---|---|---|---|
| 5,881,245 A * | 3/1999 | Thompson | H04N 7/52 375/E7.014 |
| 6,108,703 A | 8/2000 | Leighton et al. | |
| 6,141,753 A | 10/2000 | Zhao et al. | |
| 6,320,600 B1 | 11/2001 | Smith et al. | |
| 6,430,624 B1 * | 8/2002 | Jamtgaard | G06F 17/30899 707/E17.119 |
| 6,449,380 B1 | 9/2002 | Acharya et al. | |
| 6,453,335 B1 | 9/2002 | Kaufmann | |
| 6,484,199 B2 | 11/2002 | Eyal | |
| 6,665,726 B1 * | 12/2003 | Leighton | H04L 29/06 709/205 |
| 6,680,740 B2 | 1/2004 | Krueger | |
| 6,751,673 B2 * | 6/2004 | Shaw | H04L 29/06027 709/217 |
| 6,801,927 B1 | 10/2004 | Smith et al. | |
| 6,892,240 B1 | 5/2005 | Nakajima | |
| 6,989,868 B2 | 1/2006 | Masukura et al. | |
| 7,103,714 B1 | 9/2006 | Jacobs et al. | |
| 7,111,057 B1 | 9/2006 | Sherman et al. | |
| 7,127,713 B2 | 10/2006 | Davis et al. | |
| 7,200,681 B1 * | 4/2007 | Lewin | H04L 67/2842 709/246 |
| 7,240,100 B1 | 7/2007 | Wein et al. | |
| 7,293,093 B2 | 11/2007 | Leighton et al. | |
| 7,296,082 B2 * | 11/2007 | Leighton | H04L 29/06 709/231 |
| 7,305,691 B2 | 12/2007 | Cristofalo | |
| 7,339,993 B1 | 3/2008 | Brooks et al. | |
| 7,340,764 B2 * | 3/2008 | Kubota | H04L 29/06 348/E5.003 |
| 7,376,716 B2 | 5/2008 | Dilley et al. | |
| 7,454,166 B2 | 11/2008 | Patsiokas et al. | |
| 7,471,722 B2 * | 12/2008 | Tahira | H04N 19/139 375/240 |
| 7,472,178 B2 | 12/2008 | Lisiecki et al. | |
| 7,483,909 B2 * | 1/2009 | Sena | G06F 17/30893 |
| 7,508,447 B2 | 3/2009 | Tappermann et al. | |
| 7,552,338 B1 | 6/2009 | Swildens et al. | |
| 7,644,175 B2 | 1/2010 | Klemets | |
| 7,664,109 B2 | 2/2010 | Li | |
| 7,665,115 B2 | 2/2010 | Gallo et al. | |
| 7,734,591 B1 | 6/2010 | Mercier et al. | |
| 7,752,258 B2 | 7/2010 | Lewin et al. | |
| 7,801,409 B2 | 9/2010 | Howell et al. | |
| 7,895,616 B2 | 2/2011 | Unger | |
| 7,925,774 B2 | 4/2011 | Zhang et al. | |
| 7,957,733 B2 * | 6/2011 | Wang | G06Q 10/087 455/414.1 |
| 7,969,333 B2 * | 6/2011 | Normile | H04N 19/156 341/50 |
| 8,131,134 B2 * | 3/2012 | Sirivara | G10L 19/167 386/326 |
| 8,271,610 B2 | 9/2012 | Cao et al. | |
| 8,271,793 B2 | 9/2012 | Swildens et al. | |
| 8,301,741 B2 | 10/2012 | Kulasingam et al. | |
| 8,344,917 B2 * | 1/2013 | Misra | H03M 7/4093 341/107 |
| 8,412,841 B1 | 4/2013 | Swaminathan et al. | |
| 8,542,748 B2 * | 9/2013 | Zhao | H04N 19/70 375/240.26 |
| 8,543,667 B2 | 9/2013 | Hluchyj et al. | |
| 8,621,044 B2 | 12/2013 | Sood et al. | |
| 8,681,856 B2 * | 3/2014 | Bae | H04L 65/607 375/240.02 |
| 8,850,574 B1 | 9/2014 | Ansel et al. | |
| 2001/0013123 A1 | 8/2001 | Freeman et al. | |
| 2002/0046273 A1 * | 4/2002 | Lahr | G06F 11/3495 709/224 |
| 2002/0124098 A1 * | 9/2002 | Shaw | H04L 29/06027 709/231 |
| 2002/0180755 A1 | 12/2002 | Krueger | |
| 2002/0188665 A1 | 12/2002 | Lash | |
| 2003/0041095 A1 | 2/2003 | Konda et al. | |
| 2003/0187935 A1 * | 10/2003 | Agarwalla | H04L 29/06 709/206 |
| 2004/0049598 A1 * | 3/2004 | Tucker | G06F 17/30899 709/246 |
| 2004/0098344 A1 * | 5/2004 | Nakanishi | H04N 7/17318 705/52 |
| 2004/0205162 A1 | 10/2004 | Parikh | |
| 2004/0231004 A1 | 11/2004 | Seo | |
| 2004/0252977 A1 | 12/2004 | Batrouny et al. | |
| 2005/0091399 A1 | 4/2005 | Candan et al. | |
| 2005/0144165 A1 | 6/2005 | Hafizullah et al. | |
| 2005/0207734 A1 | 9/2005 | Howell et al. | |
| 2005/0226324 A1 * | 10/2005 | Ouyang | H04N 21/44021 375/240.12 |
| 2005/0229231 A1 | 10/2005 | Lippincott | |
| 2005/0262257 A1 | 11/2005 | Major et al. | |
| 2006/0029128 A1 * | 2/2006 | Tahira | H04N 19/139 375/240.01 |
| 2006/0053209 A1 | 3/2006 | Li | |
| 2006/0061600 A1 | 3/2006 | Beuker et al. | |
| 2006/0222203 A1 | 10/2006 | Mercier et al. | |
| 2006/0242155 A1 * | 10/2006 | Moore | G06F 17/30206 |
| 2007/0022215 A1 * | 1/2007 | Singer | G06F 17/3028 709/246 |
| 2007/0230568 A1 * | 10/2007 | Eleftheriadis | H04N 19/46 375/240.1 |
| 2008/0005246 A1 * | 1/2008 | VanBuskirk | H04L 12/1822 709/204 |
| 2008/0008246 A1 * | 1/2008 | Mukherjee | H04N 19/12 375/240.18 |
| 2008/0133766 A1 | 6/2008 | Luo | |
| 2008/0155628 A1 | 6/2008 | Soukup et al. | |
| 2008/0181298 A1 * | 7/2008 | Shi | H04N 21/23432 375/240.03 |
| 2008/0195698 A1 * | 8/2008 | Stefanovic | H04N 7/17327 709/203 |
| 2008/0212683 A1 * | 9/2008 | Nakata | H04N 19/70 375/240.23 |
| 2008/0225720 A1 | 9/2008 | Khemani et al. | |

(56) References Cited

U.S. PATENT DOCUMENTS

| | | | |
|---|---|---|---|
| 2009/0028142 A1* | 1/2009 | Schmidt | H04N 7/173 370/389 |
| 2009/0106288 A1* | 4/2009 | Yang | H04N 7/17318 |
| 2009/0106356 A1 | 4/2009 | Brase et al. | |
| 2009/0119580 A1 | 5/2009 | Rohrabaugh et al. | |
| 2009/0178022 A1 | 7/2009 | Horne et al. | |
| 2009/0259853 A1 | 10/2009 | Swildens et al. | |
| 2009/0276859 A1* | 11/2009 | Ojanen | G06F 21/10 726/27 |
| 2009/0297123 A1 | 12/2009 | Virdi et al. | |
| 2009/0300204 A1 | 12/2009 | Zhang et al. | |
| 2010/0118982 A1 | 5/2010 | Chatterjee et al. | |
| 2010/0146139 A1 | 6/2010 | Brockmann | |
| 2010/0150395 A1 | 6/2010 | Davis et al. | |
| 2010/0180011 A1 | 7/2010 | Sood et al. | |
| 2010/0185306 A1 | 7/2010 | Rhoads | |
| 2010/0232516 A1 | 9/2010 | Tojima et al. | |
| 2010/0235472 A1 | 9/2010 | Sood et al. | |
| 2010/0235528 A1* | 9/2010 | Bocharov | H04N 21/6437 709/231 |
| 2010/0293335 A1 | 11/2010 | Muthiah | |
| 2010/0309907 A1 | 12/2010 | Proulx et al. | |
| 2010/0318632 A1 | 12/2010 | Yoo et al. | |
| 2011/0022471 A1* | 1/2011 | Brueck | G06Q 30/02 705/14.61 |
| 2011/0022846 A1 | 1/2011 | Ginter et al. | |
| 2011/0032856 A1* | 2/2011 | Ozawa | H04L 12/6418 370/310 |
| 2011/0080940 A1* | 4/2011 | Bocharov | H04N 21/4331 375/240.01 |
| 2011/0083037 A1 | 4/2011 | Bocharov et al. | |
| 2011/0106847 A1 | 5/2011 | Bocharov et al. | |
| 2011/0107165 A1 | 5/2011 | Resch et al. | |
| 2011/0173345 A1 | 7/2011 | Knox et al. | |
| 2011/0176060 A1 | 7/2011 | Lee et al. | |
| 2011/0231569 A1* | 9/2011 | Luby | H04N 21/23106 709/234 |
| 2011/0239194 A1 | 9/2011 | Braude et al. | |
| 2011/0246782 A1 | 10/2011 | MacKay et al. | |
| 2011/0296048 A1 | 12/2011 | Knox et al. | |
| 2012/0086815 A1* | 4/2012 | Cooper | H04N 1/00204 348/207.1 |
| 2012/0259942 A1 | 10/2012 | Brookins et al. | |
| 2012/0259946 A1 | 10/2012 | Stockhammer et al. | |
| 2012/0263063 A1 | 10/2012 | Catrein et al. | |
| 2012/0331089 A1 | 12/2012 | Vonog et al. | |
| 2014/0064175 A1* | 3/2014 | Feather | H04L 65/607 370/312 |
| 2014/0309877 A1* | 10/2014 | Ricci | H04W 48/04 701/36 |

FOREIGN PATENT DOCUMENTS

| | | | |
|---|---|---|---|
| KR | 10-2008-0003961 | | 1/2008 |
| KR | 2008-0003961 | | 1/2008 |
| KR | 10-2009-0085029 | | 8/2009 |
| WO | 0217082 | | 2/2002 |
| WO | WO03069437 | | 8/2003 |
| WO | WO 03069437 | A2 * | 8/2003 |
| WO | 2006051796 | A1 | 5/2006 |
| WO | WO2008057635 | | 5/2008 |
| WO | WO2009049053 | | 4/2009 |
| WO | WO 2009049053 | A1 * | 4/2009 ............. G06Q 30/00 |
| WO | WO2009076178 | | 6/2009 |
| WO | WO 2009076178 | A1 * | 6/2009 ............... H04N 7/66 |
| WO | WO2010107627 | A2 | 9/2010 |

OTHER PUBLICATIONS

International Search Report for counterpart PCT Application No. PCT/US2011/065759, mailed on Aug. 24, 2012, 3 pages.
Written Opinion for counterpart PCT Application No. PCT/US2011/065759, mailed on Aug. 24, 2012, 4 pages.
Website Excerpt titled "USP LIVE", from www.unified-streaming.com, bearing copyright notice of 2012, downloaded May 25, 2012, 3 pages.
Website Excerpt titled "USP CDN" from www.unified-streaming.com, bearing copyright notice of 2012, downloaded May 25, 2012, 3 pages.
Website Excerpt titled "USP VOD" from www.unified-streaming.com, bearing copyright notice of 2012, downloaded May 25, 2012, 3 pages.
Website Excerpt titled "News", from www.unified-streaming.com, bearing copyright notice of 2012, downloaded May 25, 2012, 2 pages.
Website Excerpt titled "Announcing Unified Streaming Platform", from www.unified-streaming.com, bearing copyright notice of 2012, indicated as "Press Release—for release on Jul. 9, 2010", downloaded May 25, 2012, 2 pages.
U.S. Appl. No. 12/981,676 (not yet published but available in IFW).
International Search Report for counterpart PCT Application No. PCT/US2010/045766, mailed on Feb. 21, 2012, 5 pages.
Written Opinion for counterpart PCT Application No. PCT/US2010/045766, mailed on Feb. 21, 2012, 3 pages.
International Search Report for counterpart PCT Application No. PCT/US2010/062230, mailed on Sep. 30, 2011, 4 pages.
Written Opinion for counterpart PCT Application No. PCT/US2010/062230, mailed Sep. 30, 2011, 3 pages.
Zambelli, Alex, IIS Smooth Streaming Technical Overview, Mar. 2009, Microsoft Corporation, pp. 1-17.
Nelson, David M., Smooth Streaming Deployment Guide, Oct. 2009, Microsoft Corporation, 1-70 pages.
Zhao, Jian; Applying Digital Watermarking Techniques to Online Multimedia Commerce; Proc. of the Int'l Conference on Imaging Sciences, Systems, and Applications, Las Vegas, Jun. 30-Jul. 3, 1997, 7 pages.
KIPO Machine Translation of KR-10-2008-0003961, 19 pages (Applicant submits without being able to check or vouch for accuracy).
U.S. Appl. No. 12/978,447, filed Dec. 24, 2010.
U.S. Appl. No. 12/978,461, filed Dec. 24, 2010.
U.S. Appl. No. 12/978,468, filed Dec. 24, 2010.
Liao, W. et al., Architecture of Proxy Partial Caching Using HTTP for Supporting Interactive Video and Cache Consistency, Computer Communications and Networks, 2002, 6 pages.
W3C, ESI Language Specification1.0, available at http://www.w3.org/TR/2001/NOTE-esi-lang-20010804, Aug. 2001.
European Search Opinion for European Patent Application No. 11848 550.7, issued Apr. 2015, 3 pages.
European Search Opinion for European Search Opinion for European Patent Application No. 11848 550.7, issued Apr. 2015, 3 pages.
U.S. Appl. No. 12/858,177, now published as US 2011-0173345.
U.S. Appl. No. 12/978,431, now published as US 2011-0296048.
U.S. Appl. No. 13/329,081, now patented as U.S. Pat. No. 8,880,633.
U.S. Appl. No. 14/498,971, now published as US 2015-0019633.
U.S. Appl. No. 12/978,447.
U.S. Appl. No. 12/978,461.
U.S. Appl. No. 12/978,468.
U.S. Appl. No. 12/981,676.
Edge Side Includes (ESI) Overview, May 2001, 7 pages.
Technology Reports, Edge Side Includes (ESI), May 2001, 5 pages.
Edge Side Includes (ESI) Overview, 2001, 5 pages.
Wikipedia Web Page, 'Binary delta compression Wikipedia, the free encyclopedia', May 2, 2010 version, available at https://en.wikipedia.org/w/index.php?title=Binary_delta_compression&oldid=359574889 (downloaded Feb. 24, 2016), 2 pages.
Wikipedia Web Page, 'Binary delta compression Wikipedia, the free encyclopedia', Nov. 11, 2008 version, available at https://en.wikipedia.org/w/index.php?title=Binary_delta_compression&oldid=251172089 (downloaded Feb. 24, 2016), 2 pages.
Office Action for counterpart European Application No. 11849631.4, European Search Report mailed on Oct. 2, 2015, 3 pages.
Microsoft Corporation, Microsoft Windows: Binary Delta Compression, published Mar. 2004, 10 pages.

(56) References Cited

OTHER PUBLICATIONS

Potter, S. et al., Microsoft Corporation; Microsoft Windows Server 2003: Using Binary Delta Compression (BDC) Technology to Update Windows XP and Windows Server 2003, published Jun. 2005, 15 pages.

Microsoft Corporation, web page, Delta Compression Application Programming Interfaces, containing sections with various dates including 2009 (p. 2), Oct. 2009 (p. 5, 14, 30, 48), Jul. 2013 (p. 1, p. 40), 63 pages, (available at https://msdn.microsoft.com/en-us/library/bb417345.aspx, downloaded Oct. 8, 2015).

Translation of Office Action for Chinese Application No. 201180067319.0 (counterpart to instant application), First Office Action, mailed on Mar. 3, 2016, 17 pages, English translation.

Chinese Application No. 201180067319.0 (counterpart to instant application), First Office Action, mailed on Mar. 3, 2016, 26 pages, includes English translation of paragraphs 1-10.

Jeffay, Kevin et al., NOSSDAV 2000 OnLine Proceedings, The 10th International Workshop on Network and Operating System Support for Digital Audio and Video Jun. 26-28, 2000 Chapel Hill, North Carolina, USA, available at http://www.nossdav.org/2000/ (downloaded Apr. 6, 2016), 6 pages.

Mogul, J. et al. Delta Encoding in HTTP, Network Working Group, RFC 3229, Jan. 2002, 34 pages.

Nguyen, Hoa-Binh et al., GateScript: A Scripting Language for Generic Active Gateways, In Proceedings of IWAN 2004 (International Working Conference on Active Networking). Lawrence, Kansas, USA, Oct. 27-29, 2004; Thursday Oct. 28, 2004, downloaded Apr. 18, 2016 from https://drakkar.imag.fr/IMG/pdf/nguyen-iwan2004.pdf, 20 pages.

Ooi, Wei Tsang et al., Design and implementation of programmable media gateways, In Proc. of 10th. Intl. Workshop on Network and Operating Systems Support for Digital Audio and Video (NOSSDAV'00), Chapel Hill, North Carolina, available at http://www.nossdav.org/2000/papers/5.pdf, Jun. 2000, 8 pages.

Ooi, Wei-Tsang, Design and Implementation of.Distributed Programmable Media Gateways, Dissertation Thesis, Cornell University, downloaded Apr. 18, 2016 from http://www.cs.cornell.edu/Info/People/weitsang/cv.html, Aug. 2001, 149 pages.

\* cited by examiner

FORMAT-AGNOSTIC STREAMING ARCHITECTURE USING AN HTTP NETWORK FOR STREAMING

REFERENCE TO RELATED APPLICATIONS

This application claims the benefit of priority of U.S. Provisional Application No. 61/424,092, filed Dec. 17, 2010, and of U.S. Provisional Application No. 61/555,378, filed Nov. 3, 2011, and of U.S. Provisional Application No. 61/424,482, filed Dec. 17, 2010, and U.S. Provisional Application No. 61/424,112, filed Dec. 17, 2010. The disclosures of all of the foregoing applications are hereby incorporated by reference in their entireties.

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND OF THE INVENTION

1. Technical Field

This application relates generally to the online delivery of streaming content, such as high-definition video, of at broadcast audience scale to a variety of runtime environments and client devices.

2. Brief Description of the Related Art

Distributed computer systems are well-known in the prior art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" refers to the storage, caching, or transmission of content, or streaming media or applications on behalf of content providers, and ancillary technologies used therewith including, without limitation, DNS query handling, provisioning, data monitoring and reporting, content targeting, personalization, and business intelligence.

While content delivery networks provide significant advantages, they often include dedicated platforms to support delivery of content for multiple third party runtime environments that are, in turn, based on their own proprietary technologies, media servers, and protocols and formats. These distinct platforms are costly to implement and to maintain, especially globally and at scale as the number of end users increases. Moreover, at the same time, content providers (such as large-scale broadcasters, film distributors, and the like) desire their content to be delivered online in a manner that complements traditional mediums such as broadcast TV (including high definition or "HD" television) and DVD. This content may also be provided at different bit rates. End users also desire to interact with the content as they can do now with traditional DVR-based content delivered over satellite or cable. A further complication is that Internet-based content delivery is no longer limited to fixed line environments such as the desktop, as more and more end users now use mobile devices such as smartphones or tablets to receive and view.

Thus, there is a need to provide an integrated content delivery network platform with the ability to deliver online content (such as HD-quality video) at broadcast audience scale to the most popular runtime environments (such as Adobe® Flash®, Microsoft® Silverlight®, etc.) as well as to mobile devices such as the iPhone® to match what viewers expect from traditional broadcast TV. The techniques disclosed herein address this and other needs that will become apparent in view of the following disclosure.

SUMMARY

According to the teachings hereof, an integrated delivery platform provides for the online delivery of HD-video and audio quality content to popular runtime environments operating on many types of client devices in both fixed line and mobile environments.

By way of illustration, in one non-limiting aspect of the invention, the platform ingests a live content stream from an encoder and converts it to an intermediate format (IF) such as fragmented MP4 for use in transporting the stream within the system. Clients make requests to a content server that is part of the platform, which is typically HTTP-based. The content servers are preferably servers running an HTTP proxy process and providing a cache. The content servers may retrieve the live stream in a target format and serve it to the client. Alternatively, a content server may retrieve IF fragments from its own cache, or from elsewhere, and use instructions provided by the platform to convert it into the output format or perform other functions on the stream before delivering it to the client. An example of such functionality is illustrated by binary-side-includes (BSI), which is described herein. Live stream IF fragments may also be archived within the platform for later playback as part of video-on-demand or DVR functionality.

The foregoing functionality may be realized in a content delivery network operated by a content delivery network service provider. The live stream of content is associated with a content provider on whose behalf the CDN, via its plurality of content delivery machines, delivers the stream to requesting clients. Many different content providers may be utilizing the CDN to deliver their disparate content to requesting clients. Each content provider is preferably able to configure their own streaming parameters to deliver content to a variety of runtime environments and fixed-line or mobile environments.

By way of further illustration, in another non-limiting aspect of the invention, a system includes a plurality of interconnected machines, which may be part of a content delivery network (CDN). Each machine represents a computer with at least one processor and computer memory for holding computer program instructions or code to be executed by the at least one processor to facilitate delivery of a live stream to a client in a target format, the live stream originating in a source format. The source and target formats are typically multimedia container formats, and may be the same or different.

A first machine receives the live stream in a source format from an encoder converts it to an intermediate format, and serves the live stream in the intermediate format. As noted, above, the intermediate format (IF) is a format for transporting the stream within the CDN, and is preferably though not necessarily a fragmented format. In one approach, the first machine provides an entry point stream manager that receives the demuxed live stream, sets up and manages a live stream publishing point and serves current live stream fragments in the intermediate format in response to requests from the second machine.

A second machine receives the live stream in the intermediate format from the first machine and generates (i) the live stream in a target format, or (ii) instructions for use in converting the live stream from the intermediate format into a target format. More specifically, in one implementation, the second machine has a first process and a second process, the first process receiving incoming HTTP requests from the third machine and forwarding those requests to the second process, the second process forwarding the requests to a transform library function that generates at least one of: (i) the live stream in a target format, and (ii) the instructions for use in converting the live stream from the intermediate format into the target format. More specifically, for a fragmented intermediate format, the instructions specify how to convert (e.g., mux) a set of IF fragments to a target format.

A third machine (preferably a content server running an HTTP proxy that fields client requests) receives from the second machine at least one of: (i) the live stream in the target format and (ii) the instructions. If the instructions are received, then the third machine generates the live stream in the target format using the instructions. Ultimately, the third machine serves the live stream in the target format to the client. The third machine may cache the intermediate format of the stream (that is, the IF fragments) or the instructions for later use in serving other clients.

In many cases, there is also a fourth machine, a network storage subsystem that stores an archive of the live stream for DVR or VOD playback, as well as stream metadata. The first machine archives the live stream to the fourth machine as current live stream fragments in the intermediate format are being served from the first machine to the second machine.

In yet another non-limiting aspect of the invention related to on-demand streaming, a system includes a plurality of interconnected machines with a first machine receiving and parsing at least one portion of a file that is in a source format and that is associated with the on-demand stream. The first machine receives the at least one portion of the file from an origin server associated with a content provider or a remote storage system associated with a content delivery network service provider. The first machine generates at least one of: (i) an output object representing at least one portion of the file in a target format, and (ii) instructions for use in creating an output object representing at least one portion of the file in a target format. A second machine receives the output object, or the instructions for creating the output object. Preferably, the second machine is an HTTP proxy server that fields client requests for the on-demand stream, and which made a request to the first machine for such instructions or other information in order to service a client request. The second machine serves the output object to a client that requested the on-demand stream in the target format (or generates the output object from the instructions and serves it). The second machine may cache the output object or the instructions for later re-use.

In many cases, an intermediate format is used between the first and second machines. In this situation, the first machine converts the at least one portion of the file into the intermediate format, typically a fragmented format, and then generates instructions that specify how to create the output object the target format from one or more intermediate format fragments. The first machine can create an intermediate index to the at least one portion of the file. The intermediate index includes, for example, at least one of: composition time, decoding time, intermediate fragment (IF) boundaries, and a byte range offset into the file for an intermediate format fragment. The intermediate index may provide a generic interface into the file in the source format, and it may be cached for re-use by the first machine.

The instructions are typically muxing instructions, and may include format container-specific headers and request URLs for IF fragments. As noted above, they typically also comprise instructions for muxing IF fragments into the target format. The second machine can cache the instructions and/or the intermediate format fragments.

The "instructions" referred to above may be implemented using a functionality referred to herein as binary-side-includes, or BSI, which is executable in an HTTP proxy such as the third machine, above, to generate output objects (e.g., portion of a stream in a target format) given an input object (e.g., IF fragments) and instructions, which typically define manipulations or actions to be taken on the input object data. Hence a content server running an HTTP proxy may have a byte-based interpreter that takes data from one or more sources, and using one or more actions, instructs the server how to change an input object into an output object. This may include defining what order, and from what source, to fill an output buffer to generate an output object for a client. Such instructions may be cached for re-use in generating other output objects and responding to multiple client requests.

Examples of actions that can be performed with BSI are combine, insert, substitute, and remove. Conditional logic may also be included. Hence, for example, the byte-based interpreter can parse and sort the actions to be taken, constructing the output buffer to be filled, arranging bytes from one or more sources to fill that buffer.

As those skilled in the art will recognize, the foregoing description merely offers examples of the invention. It is not limiting, and the teachings hereof may be realized in a variety of systems, methods, apparatus, and non-transitory computer-readable media. It should also be noted that the allocation of functions to different machines is not limiting, as the above recited functions may be combined or allocated in a variety of ways.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the scope of the invention is defined solely by the claims. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety.

Figure 1:
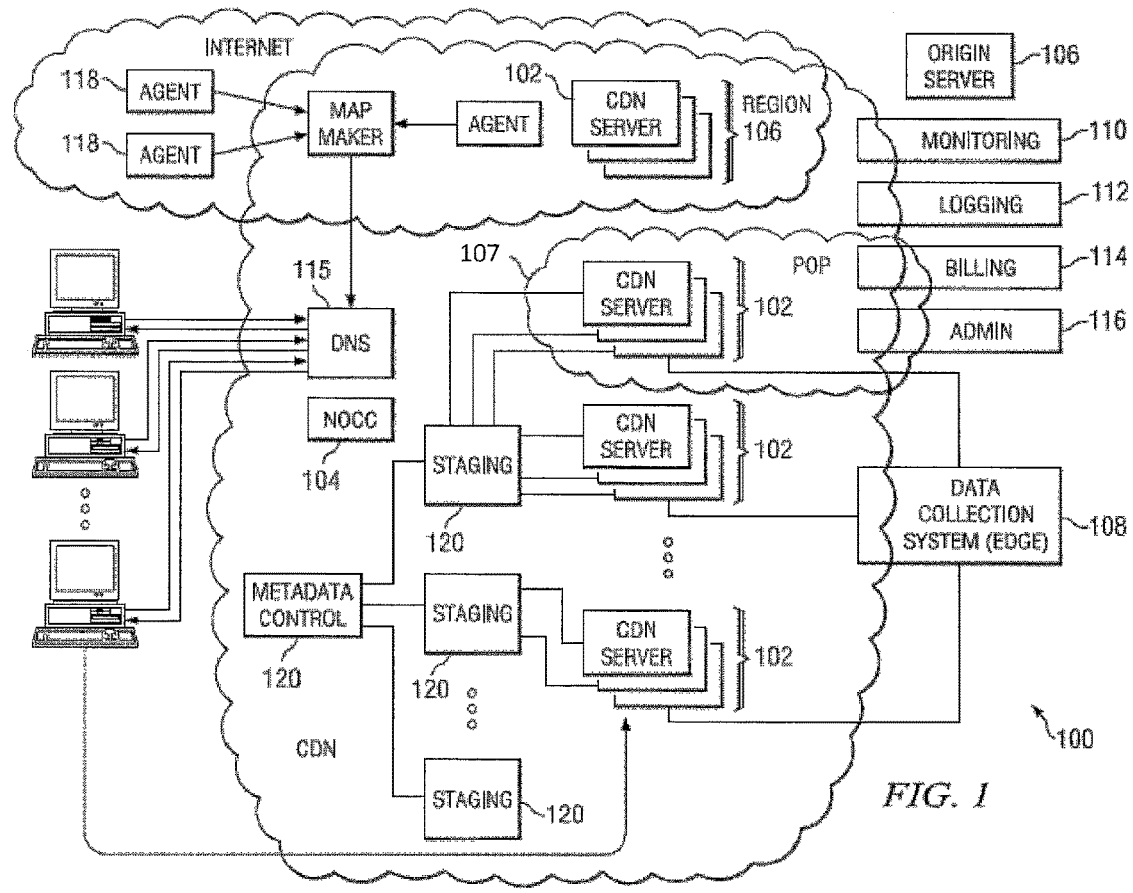
FIG. 1 is a schematic diagram illustrating one embodiment of a known distributed computer system configured as a content delivery network.

FIG. 1 illustrates a known distributed computer system that (as described below) is extended by the techniques disclosed herein to provide a HTTP-based platform with the ability to deliver online HD video at broadcast audience scale to the most popular runtime environments and to the latest devices in both fixed line and mobile environments.

In this exemplary embodiment, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML, embedded page objects, streaming media, software downloads, and the like) to the distributed computer system 100 and, in particular, to the CDN's servers (which sometimes referred to as content servers, or sometimes as "edge" servers in light of the possibility that they are located near an "edge" of the Internet). Such content servers may be grouped together into a point of presence (POP) 107.

Typically, content providers offload their content delivery by aliasing (e.g., by a DNS CNAME) given content provider domains or sub-domains to domains that are managed by the service provider's authoritative domain name service. End users that desire such content may be directed to the distributed computer system to obtain that content more reliably and efficiently. Although not shown in detail, the distributed computer system may also include other infrastructure, such as a distributed data collection system 108 that collects usage and other data from the content servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the content servers.

Figure 2:
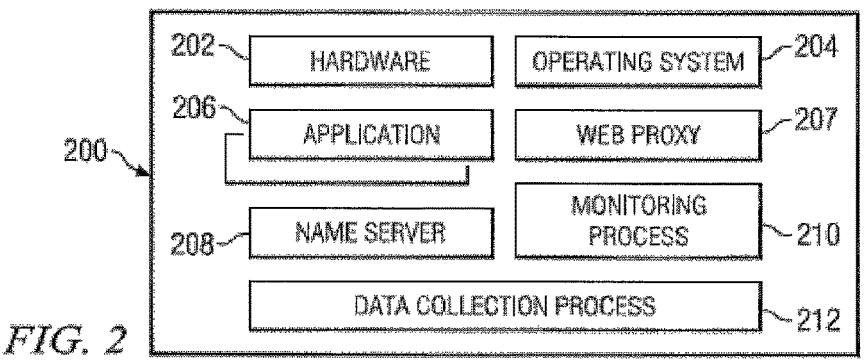
FIG. 2 is a schematic diagram illustrating one embodiment of a machine on which a content delivery server in the system of FIG. 1 may be implemented.

As illustrated in FIG. 2, a given machine 200 in the CDN (sometimes referred to as an "edge machine") comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207, a name server 208, a local monitoring process 210, a distributed data collection process 212, and the like. The HTTP proxy 207 (sometimes referred to herein as a global host or "ghost") typically includes a manager process for managing a cache and delivery of content from the machine. For streaming media, the machine typically includes one or more media servers, such as a Windows Media Server (WMS) or Flash 2.0 server, as required by the supported media formats. In some cases, functionality in this patent document is described as being performed by, or built into, an HTTP proxy 207 or ghost process of a content server, i.e., that has been suitably modified from a conventional form. This is a typical implementation and thus serves as convenient illustration. However, this is an embodiment only and is not limiting. Any such functionality may be implemented external to ghost, for example, as a separate process running in the content server.

The machine shown in FIG. 2 may be configured to provide one or more extended content delivery features, preferably on a domain-specific, customer-specific basis, preferably using configuration files that are distributed to the content servers using a configuration system. A given configuration file preferably is XML-based and includes a set of content handling rules and directives that facilitate one or more advanced content handling features. The configuration file may be delivered to the CDN content server via the data transport mechanism. U.S. Pat. No. 7,111,057 (incorporated herein by reference) illustrates a useful infrastructure for delivering and managing CDN server content control information and this and other edge server control information (sometimes referred to as "metadata") can be provisioned by the CDN service provider itself, or (via an extranet or the like) the content provider customer who operates the origin server.

The CDN may include a network storage subsystem (sometimes referred to herein as "NetStorage") which may be located in a network datacenter accessible to the content servers, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

For live streaming delivery, the CDN may include a live delivery subsystem, such as described in U.S. Pat. No. 7,296,082, the disclosure of which is incorporated herein by reference.

U.S. application Ser. No. 12/858,177, filed Aug. 17, 2010 (now published as US Publication No. 2011/0173345, the contents of which are hereby incorporated by reference), describes how the above-identified technologies can be extended to provide an integrated HTTP-based delivery platform that provides for the delivery online of HD-video quality content to the most popular runtime environments and to the latest devices in both fixed line and mobile environments. The platform supports delivery of both "live" and "on-demand" content.

As described in U.S. application Ser. No. 12/858,177, the following terms shall have the following representative meanings. For convenience of illustration only, the description that follows (with respect to live streaming delivery) is presented in the context of the Adobe Flash runtime environment, but this is not a limitation, as a similar type of solution may also be implemented for other runtime environments both fixed line and mobile (including, without limitation, Microsoft Silverlight, Apple iPhone, and others).

An Encoder is a machine, typically customer-owned or managed, which takes some raw or lightly compressed video feed in some format (streaming, satellite, etc.) and delivers the data to an Entry Point encoded for streaming delivery. The raw video feed is typically a live stream. An Entry Point (EP) typically is a process running on a CDN streaming machine which receives video data from the Encoder and makes this data available to consumers of the stream. For Adobe Flash, this can be a Flash Media Server (FMS) configured to accept connections from Encoders. A Flash Media Server is a server process for Flash media available from Adobe Corporation. In this embodiment, an Intermediate Region (IR) typically is a Flash Media Server which the CDN has configured to act analogously to a streaming set reflector, such as described in U.S. Pat. Nos. 7,296,082 and 6,751,673. These machines relay streams from FMS EPs to FMS edge regions, providing fan out and path diversity. A "Region" typically implies a set of machines (and their associated server processes) that are co-located and are interconnected to one another for load sharing, typically over a back-end local area network. A Flash machine is a Flash Media Server which has been configured to accept client requests. This is the software running on the Flash EP, IR, and content servers in a representative embodiment. Intermediate Format (IF) is an internal (to the CDN) format for sending streaming data from EP to an content server HTTP proxy. As will be described in more detail below, IF preferably comprises several different pieces, including "Stream Manifest," "Fragment Indexes," and "IF Fragments." Live, digital video recording (DVR) and video-on-demand (VOD) are generally meant to indicate the following: "Live" refers to media served in real time as an event occurs; "DVR" refers to serving content acquired from a "live" feed but served at a later time; "VOD" refers to media served from a single, complete file or set of files. Real Time Messaging Protocol (RTMP) is the streaming and RPC protocol used by Flash. Real Time Messaging Protocol Encrypted (RTMPE) is the encrypted version of RTMP using secrets built into the server and client. "SWF" or "Small Web Format" is the format for Flash client applications. SWF verification refers to a technique by which the Flash Player can authenticate to FMS that it is playing an unmodified SWF by sending hashes of the SWF itself along with secrets embedded in the client and server.

Figure 3:
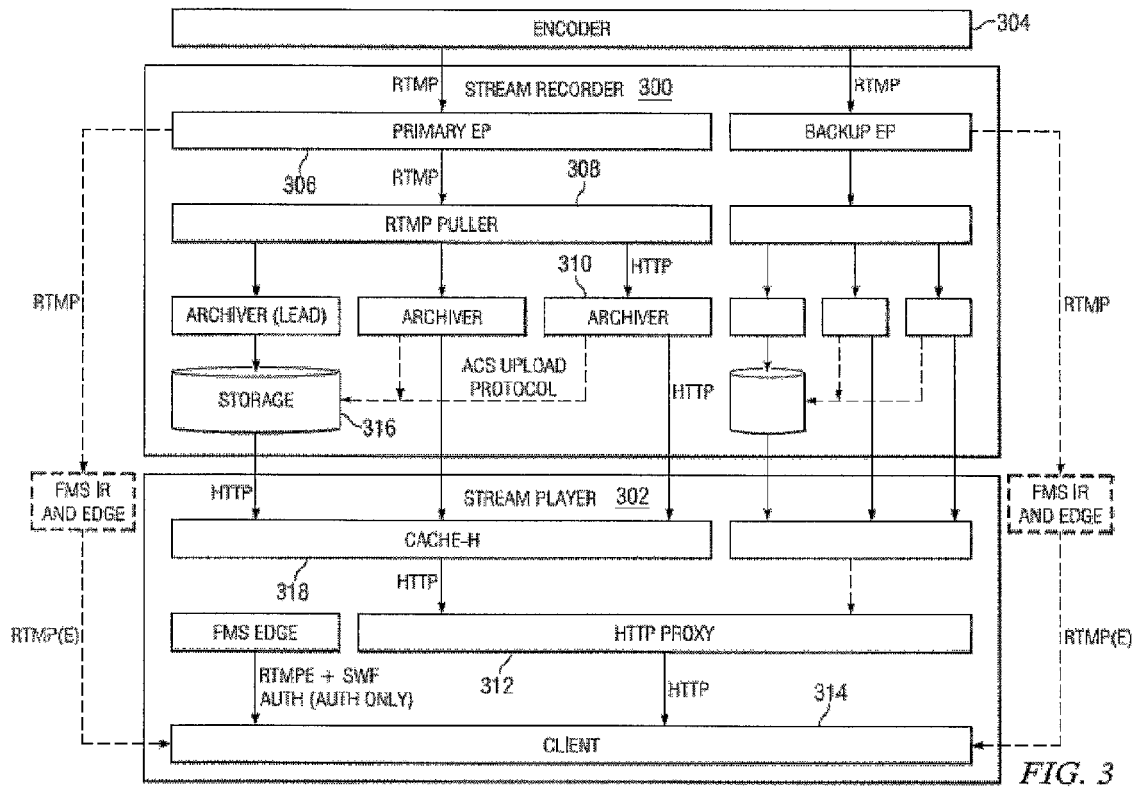
FIG. 3 is a schematic diagram illustrating one embodiment of an architecture for live streaming delivery as described in U.S. application Ser. No. 12/858,177, filed Aug. 17, 2010.

FIG. 3 illustrates an overview of an exemplary architecture for live streaming delivery as described in U.S. application Ser. No. 12/858,177, filed Aug. 17, 2010. As seen in FIG. 3, in this embodiment, the system generally is divided into two independent tiers: a stream recording tier 300, and a stream player tier 302. The recording process (provided by the stream recording tier 300) is initiated from the Encoder 304 forward. Preferably, streams are recorded even if there are currently no viewers (because there may be DVR requests later). The playback process (provided by the stream player tier 302) plays a given stream starting at a given time. Thus, a "live stream," in effect, is equivalent to a "DVR stream" with a start time of "now."

Referring to FIG. 3, the live streaming process begins with a stream delivered from an Encoder 304 to an Entry Point 306. An RTMP Puller component 308 (e.g., running on a Linux-based machine) in an EP Region (not shown) is instructed to subscribe to the stream on the EP 306 and to push the resulting data to one or more Archiver 310 processes, preferably running on other machines. In this embodiment, one of the Archivers 310 may operate as the "leader" as a result of executing a leader election protocol across the archiving processes. Preferably, the Archivers 310 act as origin servers for a content server's HTTP proxy processes (one of which is shown at 312) for live or near-live requests. The HTTP proxy 312 provides HTTP delivery to requesting end user clients, one of which is the Client 314. The Client 314 shown in this embodiment is a device that includes appropriate hardware and software to connect to the Internet, that speaks at least HTTP, and that includes a content rendering engine. The Client device type will vary depending on whether the device connects to the Internet over a fixed line environment or a mobile environment. A representative Client 314 is a computer that includes a browser, typically with native or plug-in support for media players, codecs, and the like. If DVR is enabled, content preferably is also uploaded to the Storage subsystem 316, so that the Storage subsystem serves as the origin for DVR requests as will be described.

As also seen in FIG. 3, the content provider may choose to deliver two copies of the stream, a primary copy, and a backup copy, to allow the stream to continue with minimal interruption in the event of network or other problems. Preferably, the primary and backup streams are treated as independent throughout the system up through the HTTP proxy, which preferably has the capability of failing over from the primary to the backup when the primary is having difficulties, and vice versa.

In operation, a content request (e.g., from an end user Client 314) is directed to the HTTP proxy 312, preferably using techniques such as described in U.S. Pat. Nos. 6,108, 703, 7,240,100, 7,293,093 and others. When the HTTP proxy 312 receives an HTTP request for a given stream, it makes various requests, preferably driven by HTTP proxy metadata (as described in U.S. Pat. Nos. 7,240,100, 7,111, 057 and others), possibly via a cache hierarchy 318 (see., e.g., U.S. Pat. No. 7,376,716 and others) to locate, learn about, and download a stream to serve to the Client 314.

Preferably, the streaming-specific knowledge is handled by the content server HTTP proxy 312 directly connected to a Client 314. Any go-forward (cache miss) requests (issued from the HTTP proxy) preferably are standard HTTP requests. In one embodiment, the content is delivered to the Client 314 from the HTTP proxy 312 as a progressive-download Flash video (FLV) file. As noted above, the references herein to Adobe FLV are used herein by way of example, as the architecture shown in FIG. 3 is not limited for use with Adobe FLV. For secure streams, preferably the Client 314 first authenticates to the HTTP proxy 312 using an content server authentication technique and/or a SWF-verification back-channel.

When a Client 314 requests a particular stream, the HTTP proxy 312 (to which the client has been directed, typically via DNS) starts the streaming process by retrieving a "Stream Manifest" that contains preferably only slowly changing attributes of the stream and information needed by the HTTP proxy to track down the actual stream content. The URL to download this manifest preferably is constructed deterministically from metadata delivered (e.g., via the distributed data transport mechanism of FIG. 1) to the HTTP proxy. Preferably, the manifest itself is stored in association with a Stream Manifest Manager (SMM) system (not shown) and/or in the storage subsystem 316. Preferably, a Stream Manifest describes the various "tracks" that compose a stream, where preferably each track constitutes a different combination of bit rate and type, where type is "audio," "video," or "interleaved_AV." The Stream Manifest preferably includes a sequence of "indexInfo" time ranges for each track that describe forward URL templates, stream properties, and various other parameters necessary for the HTTP proxy to request content for that time range.

For "live" requests, the HTTP proxy starts requesting content relative to "now," which, in general, is approximately equal to the time on the content server's HTTP proxy process. Given a seek time, the HTTP proxy downloads a "Fragment Index" whose name preferably is computed based on information in the indexInfo range and an epoch seek time. Preferably, a Fragment Index covers a given time period (e.g., every few minutes). By consulting the Fragment Index, an "Intermediate Format (IF) Fragment" number and an offset into that IF fragment are obtained. The HTTP proxy can then begin downloading the fragment (e.g., via the cache hierarchy 318, or from elsewhere within the CDN infrastructure), skipping data before the specified offset, and then begin serving (to the requesting Client 314) from there. Preferably, the IF fragments are sized for optimal caching by the HTTP proxy. In general, and unless the Stream Manifest indicates otherwise with a new indexInfo range, for live streaming the HTTP proxy then continues serving data from consecutively-numbered IF Fragments.

In the context of live HTTP-based delivery, the Intermediate Format (IF) describes an internal representation of a stream used to get data from the RTMP Puller through to the HTTP proxy. A "source" format (SF) is a format in which the Entry Point 306 provides content and a "target" format (TF) is a format in which HTTP proxy 312 delivers data to the Client 314. These formats need not be the same. Thus, SF may differ from TF, i.e., a stream may be acquired in FLV format and served in a dynamic or adaptive (variable bit rate) format. The format is the container used to convey the stream; typically, the actual raw audio and video chunks are considered opaque data, although transcoding between different codecs may be implemented as well. By passing the formats through the HTTP proxy (and delivering to the Client 314 via conventional HTTP), the container used to deliver the content can be changed as long as the underlying codecs can be managed appropriately.

The above-described architecture is useful for live streaming, particularly over formats such as Flash. The platform can also be used to support video on demand (VOD). In particular, the solution can provide VOD streaming from customer and Storage subsystem-based origins, provides single and multiple bitrate (SBR and MBR) streaming, provides support for origin content stored in flv and mp4/flv containers (supported mp4/flv codes include, among others, AAC, MP3, PCM for audio, and H.264 for video), and minimizes download of content beyond what is directly requested by the end user.

For VOD delivery, the stream recorder tier 300 (of FIG. 3) is replaced, preferably with a translation tier. For VOD delivery using HTTP, the Fragment Indexes may be generated from the origin content on-the-fly (e.g., by scanning FLV or parsing MP4 MOOV atoms) and caching these indexes. Actual data retrievals may then be implemented as "partial object caching" (POC) retrievals directly from source material at the HTTP proxy's region or via an intermediate translation (e.g., by a cache-hierarchy parent) into an Intermediate Format. Partial object caching refers to the ability of an HTTP proxy to fetch a content object in fragments only as needed rather than downloading the entire content object. The HTTP proxy can cache these fragments for future use rather than having to release them after being served from the proxy. An origin server from which the content object fragments are retrieved in this manner must support the use of HTTP Range requests.

As described in Ser. No. 12/858,177, filed Aug. 17, 2010, typically VOD content is off-loaded for HTTP delivery to the CDN. In a first embodiment, a conversion tool (a script) is used to convert source content FLV to IF, with the resulting IF files then uploaded to the Storage subsystem. In this approach, metadata is used to have an HTTP proxy go forward to the Storage subsystem to retrieve the stream manifest, which then references the Storage subsystem for the remaining content. In this approach, files in mp4/FLV are first converted to FLV (e.g., using ffmpeg copy mode) to change the container to FLV. Another approach is to have a CDN customer upload raw media files to the Storage subsystem and to run a conversion tool there. Yet another alternative is to have the customer (or encoder) produce content in IF directly.

An exemplary translation tier approach is described in Ser. No. 12/858,177, filed Aug. 17, 2010. In this approach, an on-demand dynamic IF generator machine takes requests for IF (manifests, indexes, and fragments) and satisfies these requests by dynamically retrieving FLV or mp4/f4v input file ranges (e.g., from the Storage subsystem or customer origin). From there, HTTP proxy treatment is essentially the same as described above with respect to the conversion tool. The generator machine preferably runs its own HTTP proxy (the "translator HTTP proxy") to cache various inputs and outputs, together with a translator process (described below) that accepts requests (e.g., from a localhost connection to the translator HTTP proxy) and generates IF based on data retrieved from the HTTP proxy via an associated cache process. In an alternative, the translator process may comprise part of the translator HTTP proxy, in which case IF generation takes place within the proxy. Fragment generation may also be carried out in the HTTP proxy or even further downstream (into the Client 314 itself), such as where a Client 314 maintains a session connection with one or more peer clients.

Figure 4:
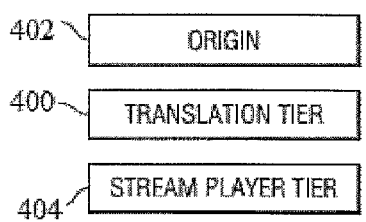
FIG. 4 is a schematic diagram illustrating one embodiment of an architecture and request flow of a video-on-demand approach as described in U.S. application Ser. No. 12/858,177, filed Aug. 17, 2010.

An architecture and request flow of a VOD approach is shown in FIG. 4. In this embodiment, a translation tier 400 is located between an origin 402 (e.g., customer origin, or the Storage subsystem, or other source of content) and the stream player tier 404. In a representative embodiment, the translation tier 400 executes in its own portion of the CDN (e.g., in a Microsoft IIS or equivalent network), preferably in a region dedicated to this purpose. Alternatively, a translator may run on a subset of HTTP-based machine regions.

While the above-described embodiments provide a format-agnostic streaming architecture that utilizes an HTTP network for object delivery, the following describes several architecture enhancements.

Live Streaming Components

Figure 5:
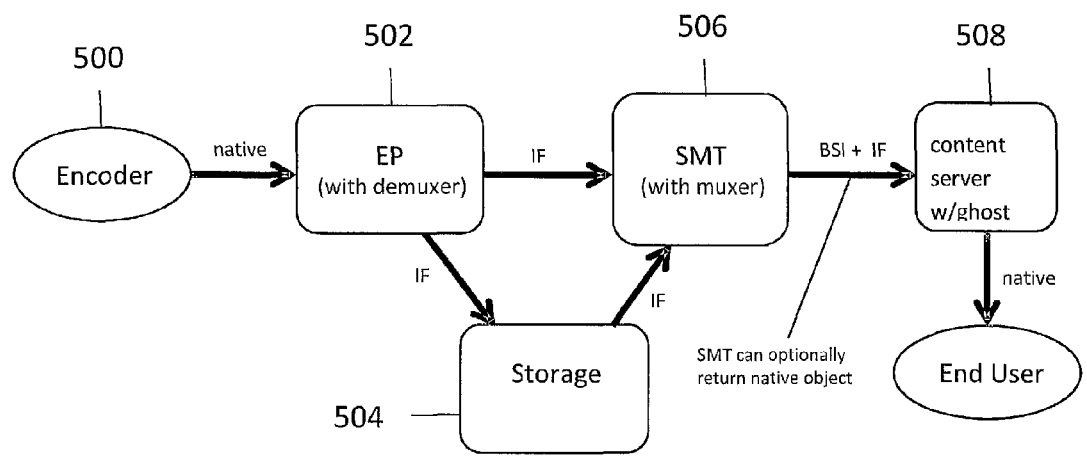
FIG. 5 is a schematic view of one embodiment of an architecture for live streaming.

FIG. 5 is a high-level component diagram illustrating one embodiment of an architecture for streaming live content. In this embodiment, the Entry Point (EP) 502 ingests the stream to be delivered from an encoder 500, demuxes the stream from its native format to an IF format, such as a fragmented format like f-MP4, and archives the stream to Storage 504 (typically a network storage subsystem). The EP 502 serves "current" live stream fragments to a Streaming Mid-Tier (SMT) process 506, which is typically running on a separate SMT machine. The SMT 506 retrieves "current" live stream fragments from EP 502, and it generates a muxed output in the desired native format. In an alternative embodiment, the SMT 506 generates muxing instructions for use by a content server with an HTTP proxy process (or "ghost") 508 in a CDN. The instructions are returned to the content server process 508, along with the IF fragments if needed, although the IF fragments may have been previously cached by the content server 508 or retrieved by the content server from Storage 504 instead. The muxing instructions may be realized as binary-side-includes, or BSI, which will be described in more detail below. The content server ghost process 508 forwards end-user requests to SMT 506, caches the response from SMT 506, which response either is a native output object for the stream or a BSI fragment, and, when BSI is used, the content server ghost 508 also creates an output object from the BSI and IF fragment. The content server ghost 508 also delivers the native output object to the end-user client, typically a client player application. It does not need to understand any container format(s). The Storage 504 stores an archive for DVR or VOD playback, and it also stores live stream session metadata.

On Demand Streaming Components

Figure 6:
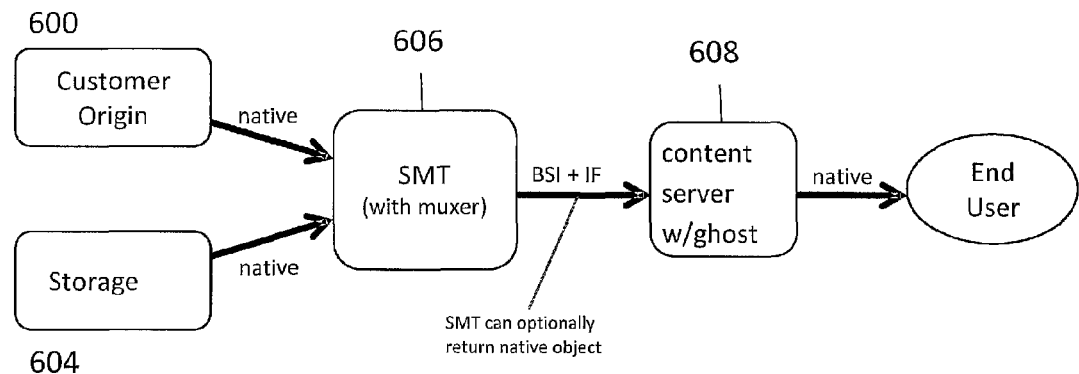
FIG. 6 is a schematic view of one embodiment of an architecture for on-demand streaming.

FIG. 6 is a high-level component diagram illustrating one embodiment of an architecture for streaming on-demand content. In this embodiment, the SMT 604 requests and receives the native on-demand file from either a customer origin 600 or Storage 604 (again, typically a network storage subsystem). The SMT 606 parses a native source file index and creates an intermediate MetaIndex. It also generates a muxed output object or SMT 606 generates muxing instructions (BSI or equivalent functionality) for use by the content server ghost process 608 to create the native object. The content server ghost process 608 forwards end-user requests to SMT 606, caches the response from SMT, which response either is a native output object or a BSI fragment, and, when BSI is used, the content server ghost process 608 also creates an output object from the BSI and IF fragment. Storage 604 typically stores on-demand files in native format.

Live Streaming Operation

Figure 7:
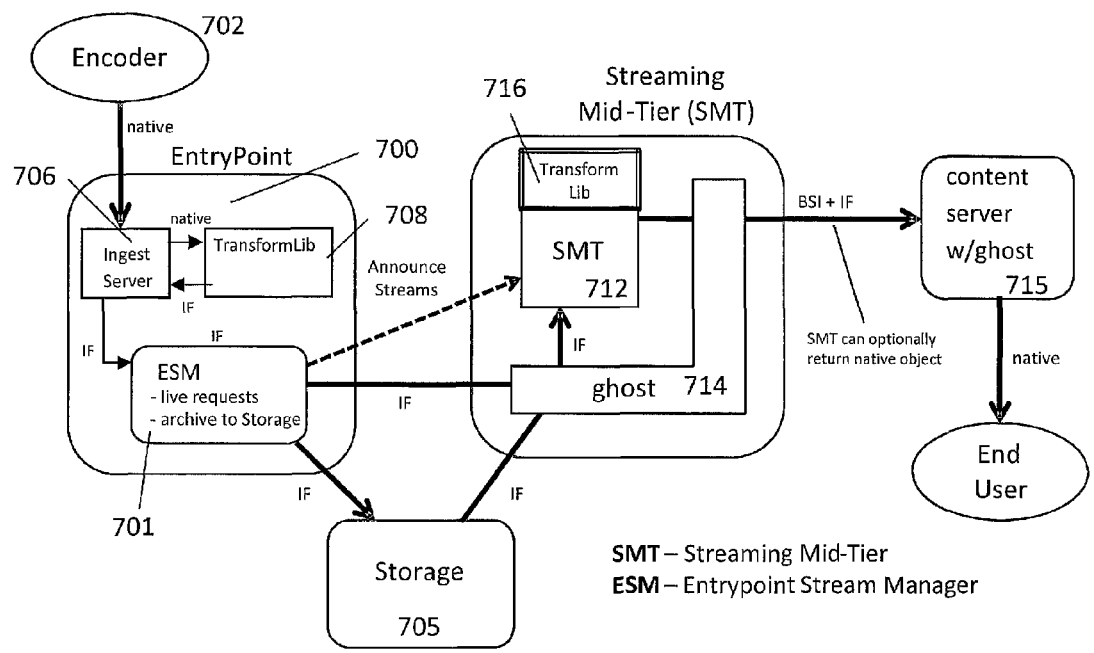
FIG. 7 is a schematic view illustrating the live streaming architecture of FIG. 5 in more detail.

FIG. 7 illustrates further details of the EP and SMT components and their respective functions.

In this embodiment, the EP 700 comprises two services: an ingest server 706 and an entry point stream manager (ESM) 701. The ingest server 706 is composed of a format-specific ingest server 706 and a library of functions 708, called TransformLib. The library 708 is a shared library that is linked into the ingest server 706. The library contains format-specific logic for muxing and demuxing. In operation, the ingest server 706 receives a stream from an encoder 702, authenticates the encoder 702, passes the received data to the library 708 for demuxing, and sends the demuxed stream to the ESM 701. The library, as noted above, demuxes from a native format (e.g., MP3, MPEG2-TS, or otherwise) to the IF, such as f-MP4. The ESM 710 is a format-independent component that preferably resides on the EP 700. The role of ESM 701 preferably is the same across different streaming formats. It received the demuxed stream from the ingest server 706, manages ESM publishing points, archives the stream to Storage 705, serves "current" live request from SMT, and announces active streams to all SMTs. An EP machine may be a Windows-based server, or a Linux-based server, or otherwise. Preferably, the ESM code is cross-platform compatible.

The SMT machine comprises two primary services; SMT 712 and local ghost process 714. The local ghost process 714 handles incoming HTTP requests from an content server ghost process 715. In response, the local ghost process 714 makes a forward request to the local SMT component 712. SMT component 712 passes the incoming request to TransformLib 716 for processing, and that processing is based on the container format. Preferably, TransformLib 716 first rewrites the container-specific incoming URL to an IF (e.g., f-MP4) forward URL. SMT 712 then retrieves the IF fragment on behalf of TransformLib 716. Finally, TransformLib 716 uses the IF fragment to create instructions (BSI), and to serve back any IF requests to the content server ghost 715. TransformLib 716 creates the output object in native format if the instruction set (BSI) approach is disabled. As noted, the local ghost process 714 makes the forward requests (to SMT component 712), and it caches the forward response on local disk. An intermediary caching process may be used between the SMT 712 and local ghost process 714. By using local ghost process 714 in the SMT machine, ghost-to-ghost communications between the content server and the SMT may be used (and optimized).

Figure 8:
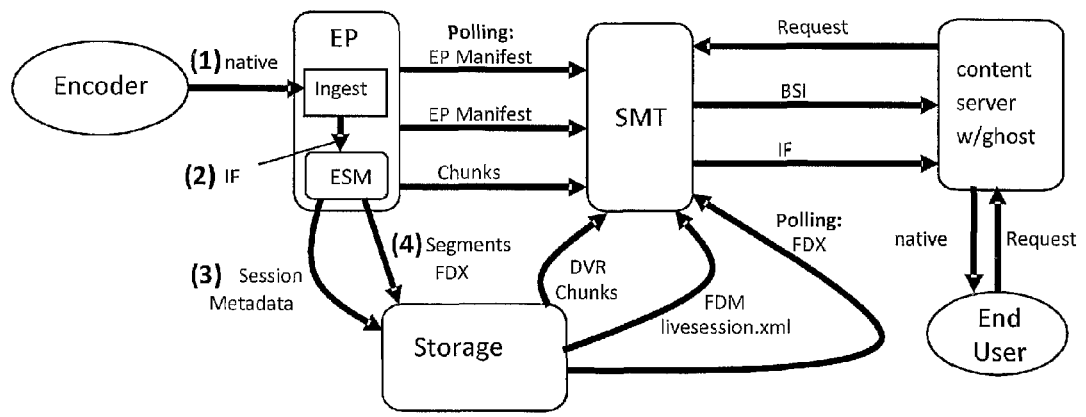
FIG. 8 illustrates an illustrative first live streaming workflow used when a stream is published from an encoder to an entrypoint (EP)

FIG. 8 illustrates an embodiment of a first live streaming workflow embodiment that is used when a CDN customer publishes a stream from its encoder to a CDN EP.

Figure 9:
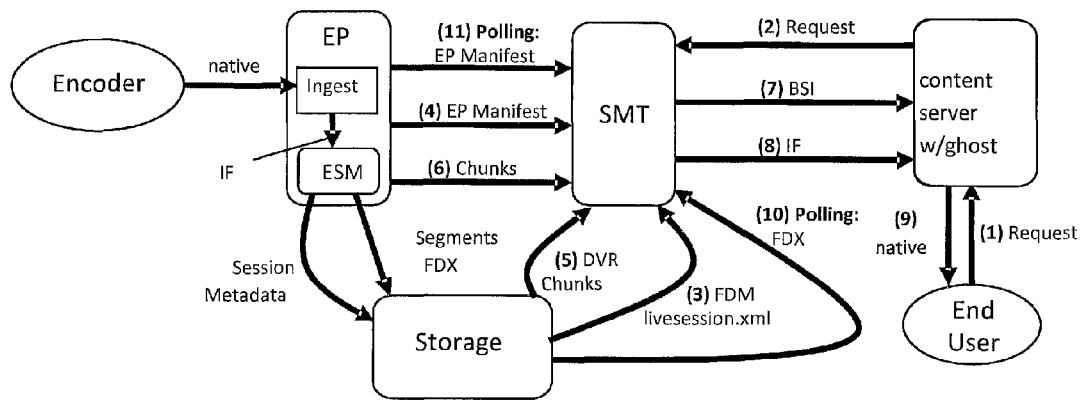
FIG. 9 illustrates an illustrative second live streaming workflow used when an end-user makes a live request for content.

FIG. 9 illustrates an embodiment of a second live streaming workflow that is used when an end-user makes a live request to a content server.

Referring now to FIG. 8, the encoder publishes a live stream to the EP. The ingest server authenticates the encoder connection, preferably using a streamID to lookup the appropriate stream configuration (Step 1). Ingest server then demuxes the input and pushes the stream to ESM (Step 2). ESM auto-creates a publishing point, preferably uploading to Storage three (3) XML-based files: LiveSession, LSM, and ACF. These per-session metadata files are created at the start of each live stream session (Step 3). The LiveSession file includes live stream information, such as entrypoint IP, sessionID, and streamState. The LSM includes session-specific metadata like bitrates, etc. ACF includes information for use in configuring an archive copy of the live stream. As ESM receives fragments from the ingest server, it aggregates the fragments into segments on the local disk. When the segment size reaches the accumulation threshold, it uploads the segment to Storage. With each segment uploaded to Storage, ESM also uploads an FDX file (Step 4).

The FDX (Fragment Index) file is a binary encoded file that provides an index of the fragments that have been uploaded to Storage. This index tells SMT what fragments are in Storage and where to locate them. For fragments that are not in the FDX file, the fragment either is on the EP (because it has not been uploaded to Storage yet) or the fragment does not actually exist. Once the stream is stopped, the LSM and livesession.xml file are updated to change the "streamState" property from "started" to "stopped."

FIG. 9 illustrates an exemplary embodiment of a workflow when an end-user client makes a live streaming request to an content server ghost process on a content server. The client (e.g., a client media player application) makes a stream request to the content server ghost process (Step 1). This process then makes a forward request to SMT (Step 2). If this is the first request for this live stream to the SMT machine, SMT constructs and caches information about the live stream. To get this information about the live stream, SMT pulls information from Storage for the past DVR fragments and pull information from the EP for the current fragments. SMT makes a request to Storage to get the livesession.xml and LSM file. The LSM file will give information about live stream and what FDX files to lookup for a particular fragment index range (Step 3). To know what fragments are on the EP, the SMT makes a Manifest request to the EP and the Manifest will list the current set of fragment indexes that reside on the EP (Step 4). Once SMT finds and obtains the requested fragment, it muxes the fragment to the output format. When BSI instructions are used, SMT does not create the actual output object but, instead, SMT creates a BSI instruction response containing the appropriate container format headers and IF fragment request (Step 7). The content server makes a request for the IF fragment, and preferably this request is only for the "mdat" data, which is the video/audio data (Step 8). The content server ghost process then uses the instructions in the response and the IF fragment to construct the output object. It sends the resulting output object back to the end-user as a response to the original request (Step 9). For SMT to know what fragments are in Storage, preferably it continuously polls Storage for a latest version of the FDX file (Step 10). Polling interval for the FDX file typically is a given, potentially configurable time period (Step 10). For SMT to know what fragments are available on the EP, preferably SMT polls the EP for a latest Manifest file (Step 11).

The following section describes preferred URL formats for live, archive and IF requests from a client-player→content server→SMT.

In one embodiment, for live stream requests, the client player URLs have the following format:
http://<domain>/<formatPrefix>/<streamID>/<streamName>/<additionalParams>

Live and Archive URLs preferably have a prefix that denotes that streaming container format and the type of request (e.g., live, archive).

In one embodiment, for archive stream requests, the client-player URLs have the following format:

http://<domain>/<formatPrefix>/<streamID>/<streamName>/<sessionID>/<streamName>/<additionalParams>

The sessionID part of the URL differentiates archives from different live stream sessions. An archive URL gives the location of the archive directory in Storage. The archive URL "format" is simply the path to the default Storage location to which the archive is uploaded. If desired, the archive can be moved to a different Storage directory, in which case the archive path URL is changed to the new Storage directory location. Preferably, the archive URL is immediately available for playback even if the live event is not over yet. The archive URL represents the content that has been archived to Storage so far. For example, if the live stream event has been running for 60 minutes and 58 minutes of the event has been archived to Storage, the archive URL represents a VOD file that is 58 minutes long. As more content is archived to Storage, the archive URL represents a longer and longer VOD file.

An IF URL is constructed by taking the "base URL" of the client request and appending Fragment(<params>) to the end. The "base URL" typically is the portion of the URL that is up to and including the file name. The IF URL parameters are name/value pairs separated by commas and specify bitrate and response types:

http://<domain>/<formatPrefix>/<streamID>/<streamName>.<fileExtension>/Fragment(brt=<bitrate>,idx=<fragmentIndex>,trk=<trackName>,typ=<fragmentType>)

Illustrative parameter tag names include:
brt—Bitrate
idx—Fragment index
trk—Track name (usually audio or video)
typ—Type of response fragment, possible values are: bsi, frg, hdr, dat For the "typ" parameter, if "bsi" is specified, SMT will return a BSI fragment response. (Note that for implementations that involve instruction sets other than BSI, the parameter might be "instr_set_name".) If "frg" is specified, SMT will return the f-MP4 fragment. If "hdr" is specified, SMT will only return f-MP4 headers. If "dat" is specified, SMT will return the mdat box of the f-MP4 fragment. The mdat box is the MP4 box containing the audio/video samples.

In operation, as ESM receives the live stream fragments from the ingest server, ESM writes the data to local disk. For multi-bitrate streams, ESM has a configurable option to either coalesce all bitrates into a single file or have a different file per bitrate. The advantage of coalescing into a single file is that the number of file uploads to Storage is reduced. The disadvantage of a single file is that it is not possible to only retrieve fragments for a single bitrate without also retrieving fragments for other bitrates, thereby making caching less efficient on SMT when a single bitrate is being requested by the end-user. In either case, though, all of the fragments usually are in a single file (be it for one bitrate or many). An ESM trailing window parameter configures how much ESM will save on local disk. Once a segment is outside the trailing window, ESM will delete it from local disk.

If an "Archive to Storage" parameter is enabled, ESM will archive the stream to Storage for DVR or later VOD playback. Typically, ESM stores the last "n" minutes of a live stream. If a customer wants a 4 hour DVR window for their live stream, the customer enables "Archive To Storage" so that fragments older than n minutes are saved in Storage and available for DVR. For certain streams, the customer can disable "Archive To Storage" and the live stream is not uploaded to Storage. In such case, live stream fragment requests are served from the EP. Some customers have 24×7 streams and want say, one (1) day DVR functionality. In that case, the customer enables "Archive To Storage" and enables a 1 day "Archive Trailing Window". By archiving to Storage, DVR requests older than "n" minutes are available from Storage. The "Archive Trailing Window" setting can limit the size of the archive that is stored in Storage. For example, if the "Archive Trailing Window" is set to 1 day, ESM will automatically delete from Storage fragments that are older than 1 day. This is beneficial for the customer because they can have a long DVR window but do not need to worry about cleaning up Storage for their long running live streams.

Figure 10:
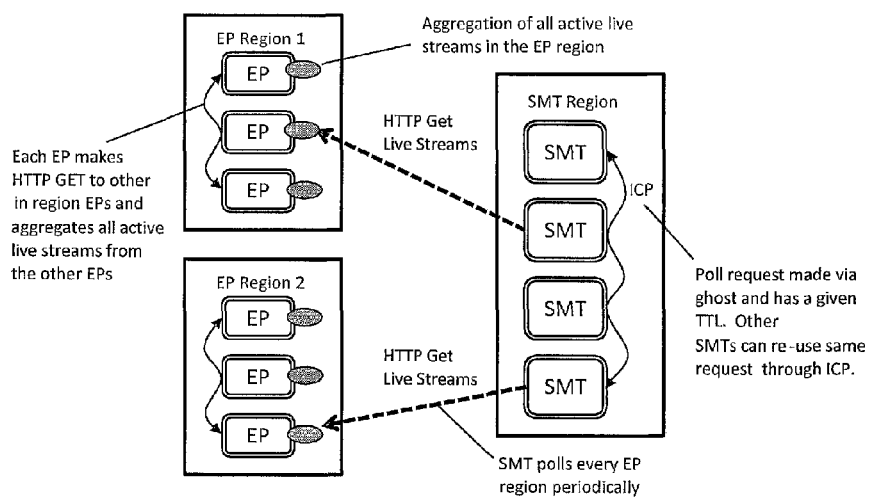
FIG. 10 illustrates an example of a process by which live streams can be announced in the exemplary architectures shown in FIGS. 5, 7, 8 and 9.

SMT can determine all the active live streams through stream "announcements" from ESM. A preferred technique is illustrated in FIG. 10. In this particular implementation, the SMT must know the state of all live streams because the content server ghost process can make a live stream request to any SMT, and SMT needs to know which EP to get the fragments from. If the live stream state is inactive, on the other hand, SMT would know to retrieve the fragments only from Storage (assuming "Archive To Storage" option was enabled).

In the embodiment illustrated in FIG. 10, live stream announcements between SMT and ESM are done using HTTP GET requests from SMT to ESM. To reduce the amount of HTTP requests from SMT to EP, preferably each ESM in an EP region (e.g., EP region 1 or 2, as shown) makes an HTTP request to other EPs in the same region and asks for all live streams on the EP. ESM aggregates together all active live streams from the other EPs in the same region. In this way, SMT only needs to make a HTTP GET request to a single EP machine in an EP region (that is, a set of EP machines) to get information about all active live streams in a region. Second, when SMT makes a request to an EP machine, preferably the request is made via the SMT local ghost process with a given (e.g., 5 second) time-to-live (TTL). Then, when other SMT machines in the SMT region make the same request to the EP region, that request can be potentially served though Inter-Cache Protocol or ICP (that is, a protocol by which other SMTs in the SMT region can respond to the request, if possible, obviating the need to go forward to an EP) because another SMT in the SMT region already made the same request just seconds earlier.

Because the forward request to an EP explicitly would contain the EP IP address, all SMTs in a region should be making an HTTP request to the same EP machine in the EP region to utilize ICP. If the request was not made to same EP machine, the cache key will be different and ICP cannot be used. Therefore, the algorithm to choose the EP machine to query preferably is deterministic and repeatable across all SMTs so that all SMTs will make the forward request to the same EP in the EP region. Preferably, polling from SMT to EP is done every few seconds and is configured through a global server setting. Having a short polling interval minimizes the amount of time between a customer publishing a stream and the SMT knowing the stream exists on the EP. The request logic from SMT to EP handles situations where an EP is down for maintenance or temporarily inaccessible.

As noted above, the live stream archive is stored on Storage for later VOD playback. Any metadata for the live stream session is also stored on the Storage system, preferably in the same location as the live stream archive. If "Archive To Storage" is not enabled, nothing is stored on Storage.

To simplify output muxing to any container format, as noted above, ingested fragments are demuxed into the IF format (Intermediate Format). Once an ingest stream is converted (demuxed) to IF, the muxer can convert from the IF format to any supported streaming container format. This simplifies conversion from any input (source) format to any output (target) format. The PIFF (Protected Interoperable File Format) container format, available from Microsoft, may be used as the basis for the IF container format. PIFF enhances the MPEG-4 Part 12 specification by providing guidelines and UUID extensions for fragmented multibitrate HTTP streaming. Besides PIFF, other choices for container formats are Adobe's HTTP Streaming For Flash (Zeri), Apple's MPEG2-TS, or a proprietary format.

For the live stream configuration, preferably there are different metadata channels for each streaming format.

Fault Tolerance, Redundancy, and Replication

For stream redundancy and failover, customers may publish a stream to a primary and one or more backup Entry Points. EPs also may support DEEM (Dynamic Entry Point to Encoder Mapping) to provide optimal DNS mapping from encoder to entry point. If an EP were to go down, DEEM can minimize stream downtime by quickly remapping an entry point alias (e.g., via a DNS CNAME) to an EP that is up and running DEEM functionality includes the ability to resume a live stream session when the EP alias switches from one EP another EP. When an encoder is pushing a stream to one EP and that EP goes down, DEEM remaps the alias, the encoder then starts pushing to the new EP, and the EP "appends" fragments to the previous live stream session. This means the live stream DVR from the previous session is retained and the archive in Storage is uninterrupted.

For EPs to support DEEM, whenever an encoder pushes a stream to the EP, the EP must determine if the stream is a brand new stream or a DEEM failover from a previous live stream session. The EP determines the state of the stream by getting the corresponding livesession.xml from Storage. The livesession.xml contains the "streamState". If the stream is a DEEM failover, the "streamState" will have a "started" value. The EP also does consistency checks, such as query the old EP to determine if the stream actually existed. Consistency checks ensure that the new EP does not unintentionally consider the stream to be a DEEM failover stream when it is not. For the case when a stream is not archived to Storage, the EP simply ingests the live stream without retrieving the livesession.xml from Storage. The SMT does the work of stitching the live stream from different EPs into a single live stream.

The livesession.xml contains the following attributes for DEEM support:
  streamState—holds state of the stream
  lastRefreshTime—time when the EP last updated the livesession.xml with the current state
  discontinuityThreshold—time threshold at which the EP will not resume a previous live stream By default, the "discontinuityThreshold" is set to a given time period, e.g., 30 minutes. This means if an EP goes down and the encoder does not push the stream to the new EP within 30 minutes, the live stream session will not be resumed. The EP checks if the threshold has been exceeded by subtracting the current time against the "lastRefresh- Time". If this time difference is more than 30 minutes, the EP will not resume the previous live stream session.

For SMTs to support DEEM, SMT tracks stream states via stream announcements. When the encoder is stopped, a live stream is transitioned to the "stopped" state on the EP. If the EP goes down, the stream does not gracefully transition to the "stopped" state. The SMT tracks ungraceful stream state transitions, and it stitches together live stream sessions if needed. SMT combines DVR fragments from a previous live session and the currently resumed live stream session. From the end-user point of view, the merged live stream sessions is a single live stream session.

Figure 11:
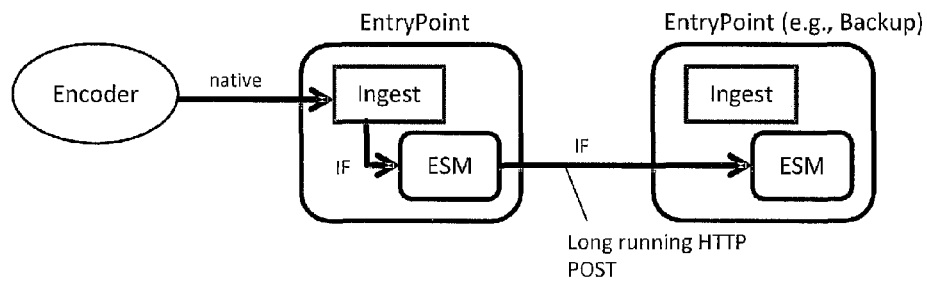
FIG. 11 illustrates an example of a technique for replicating live streams.

In certain circumstances, it may be desirable to replicate a single ingest stream to another EP. One possible use case facilitates live stream archive redundancy, which can be used for providing a hot backup of the live stream archive on the backup EP. In this approach, if the primary EP were to go down, the encoder can start pushing the stream to the backup and past DVR is still available because it was auto replicated. Another use case for such replication is live stream redistribution, in which the live stream may be replicated to an EP that is far away (e.g., ingest in United States and replicate to Europe). With the stream replicated to another EP farther away, the content server, SMT, EP, and Storage serving that far away region can be located closer together (all in Europe, for example), reducing the network distance between them. FIG. 11 illustrates one illustrative technique. In this embodiment, preferably ESM on the ingest entry point has an option to replicate the stream. The replicated stream is sent either to the backup EP or another EP altogether. Where stream replication is used, the target stream preferably uses a different stream ID than the source stream.

On-Demand Streaming Operation

Figure 12:
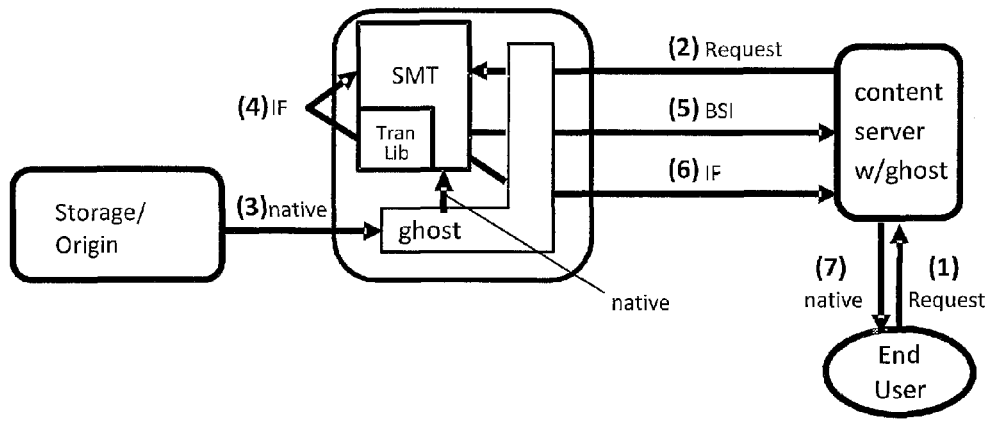
FIG. 12 illustrates one embodiment of an on-demand streaming workflow used when an end-user makes a request for content.

Similar to live streaming, and as shown in FIG. 12, in an on-demand embodiment, an SMT component handles on-demand requests from a content server. The same SMT machine can handle both live and on-demand requests.

As shown in FIG. 12, the SMT machine preferably has two primary services: SMT, and local ghost. The SMT service uses TransformLib to process the request URL, and TransformLib constructs the appropriate forward requests to Storage or customer origin. These forward requests are made via the SMT local ghost process and use a cache process as an intermediary between SMT and local ghost. Preferably, the same TransformLib component is used for on-demand and live streaming.

The following details the workflow when an end-user makes an on-demand stream request to the content server. The client player makes a stream request to the content server (Step 1). The content server ghost process makes a forward request to SMT machine (Step 2). If this is the first request to the SMT machine for this on-demand stream, SMT needs to construct and cache information about the on-demand stream. To get this information, SMT first passes the request URL to TransformLib, and TransformLib constructs the appropriate forward requests for the native format file. SMT makes these forward requests to Storage/customer origin via SMT's local ghost process (Step 3). TransformLib takes the forward responses and constructs the response (e.g., BSI) for the requested output format (Step 4). SMT returns the response back to the content server (Step 5). The BSI response contains the container-specific format headers and the request URLs for the IF fragments. Based on the BSI instructions, the content server ghost process makes IF requests to construct the output object (Step 6). The output object is returned to the end-user in the native format (Step 7). As noted above, BSI is optional but can be used to reduce the cache footprint on the content server ghost process. If BSI is not enabled, SMT can return the native output object to the content server ghost process. The native output object can be cached by the content server just like any HTTP object from an origin server.

For on-demand requests, the client-player URLs may have the following format:
http://<domain>/<formatPrefix>/<forwardpath>/<streamName>

Similar to live and archive URLs, on-demand URLs have a prefix that denotes the streaming container format and type of request (i.e., on-demand).

If BSI functionality is enabled, SMT returns a BSI fragment that consists of the container headers and the IF URLs for the mdat data. For iPhone, e.g., the IF URLs look like the following for audio and video:

```
http://example.com/iosvod/path/video.mp4/Fragment(brt=512000,idx=5000,trk=video,typ=dat)
http://example.com/iosvod/path/video.mp4/Fragment(brt=64000,idx=5026,trk=audio,typ=dat)
```

The Fragment(<params>) portion is appended to the "base URL" of the client request (e.g., video.mp4 in the example above). The "base URL" is typically the portion of the URL up to and including the file name but can vary depending on the streaming format.

Figure 13:
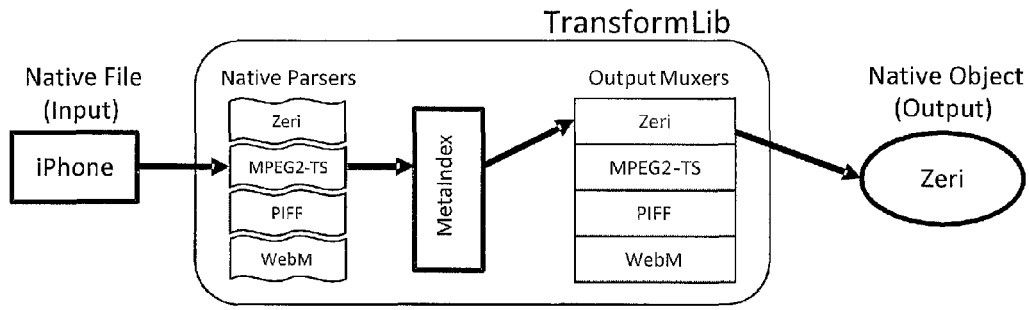
FIG. 13 illustrates an example of the TransformLib component in more detail.

For muxing into the desired output format, TransformLib on the SMT contains the logic to demux the native input file and mux into the requested output object. For the request processing workflow, TransformLib first parses the native input file to generate a MetaIndex. The MetaIndex is a generic index that contains information such as composition time, decoding time, IF fragment boundaries, and byte range offsets into the native source file for each IF fragment. The output muxers use the MetaIndex to extract the appropriate bytes from the native source file and use the other information such as composition time to construct the appropriate container headers. The MetaIndex provides a generic interface into the native source files. This interface is an abstraction layer on top of the native source file so that the output muxers do not need to be aware of the underlying container format. A benefit of this design is that if it is desired to support a new input container format, a new native source file parser/demuxer is implemented, but the output muxers remain the same. Similarly, if it is desired to support a new output container format, a new muxer is implemented but input demuxers remain the same. FIG. 13 illustrates this abstraction layer. If desired, the MetaIndex may be cached within SMT's local ghost process cache for later reuse or for use by an ICP peer. Creating the MetaIndex can take time, and caching on the local ghost process decreases the response time for the first VOD fragment request. To support local ghost process caching, SMT makes a local host request via ghost for "/metaIndex". The loopback request is handled by the local SMT, and its response is cached by the ghost process. Other SMTs in the region also get the benefit of using this MetaIndex because it is available via ICP.

The above-described architectures (for live or on-demand) is extensible to support any streaming format. The following section describes how to support a new streaming container format.

Figure 14:
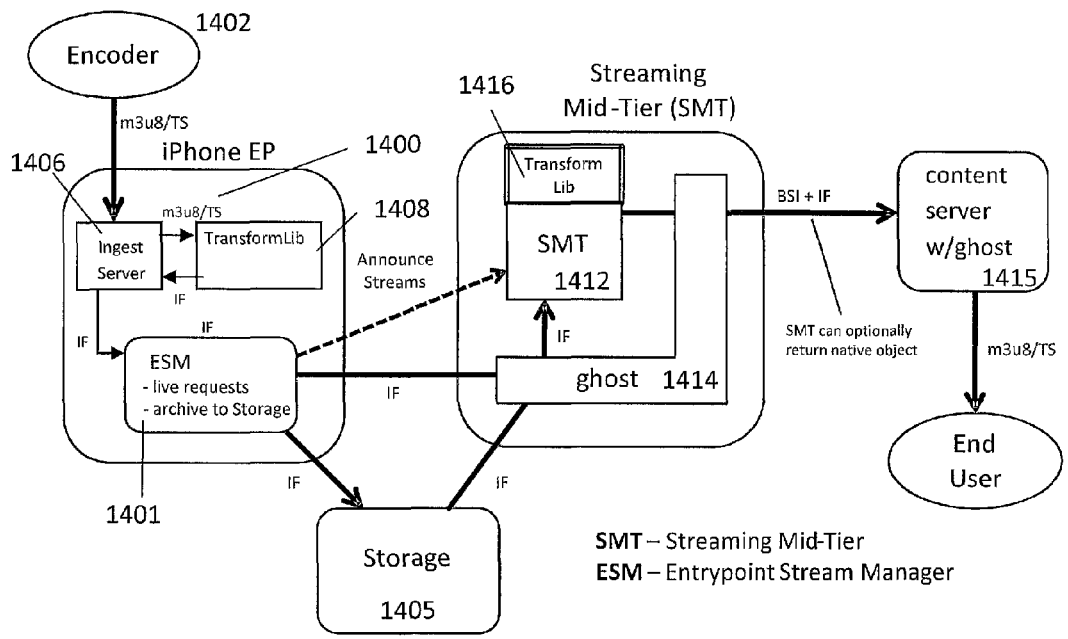
FIG. 14 illustrates one embodiment of a workflow supporting ingestion and output of a content stream in a given format.

FIG. 14 illustrates one exemplary embodiment of a technique for supporting ingestion of iPhone content and output of iPhone content. In this embodiment, an iPhone EP 1400 ingests an Apple-Segmented MPEG2-TS stream, and TransformLib 1408 supports MPEG2TS for demuxing and muxing MPEG2-TS. TransformLib 1408 parses iPhone URLs and rewrites them to the forward path. On the EP 1400, the iPhone ingest server 1406 handles HTTP POST/PUT requests from the encoder 1402. The iPhone ingest server passes the TS segments to TransformLib 1408 for demuxing into IF (e.g., f-MP4) format. The iPhone ingest server then sends the IF fragments to the local ESM 1401. The ESM archives the stream to Storage and announces the live stream to the SMTs, as described above. On the SMT 1412, the TransformLib 1416 processes iPhone request URLs for m3u8 and MPEG2-TS. TransformLib 1416 constructs the BSI response and returns it to the content server 1415. For MPEG2-TS segments, data packets are interleaved with container headers every 188 bytes. This means that for every 188 bytes of audio/video, there will be some container headers. Preferably, the BSI syntax supports loop constructs to reduce the complexity of the BSI response and still generate the appropriate MPEG2-TS segment. Using BSI to mux the object on the content server is optional. SMT 1412 can also return native MPEG2-TS segments back to the content server 1415 if BSI is disabled.

Figure 15:
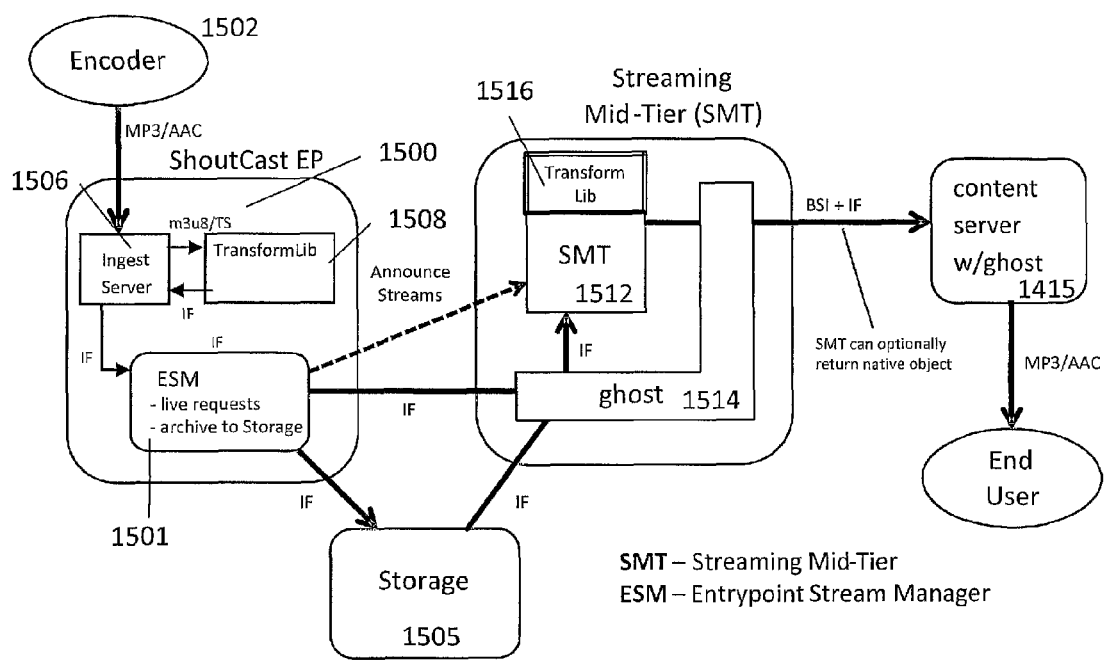
FIG. 15 illustrates one embodiment of a workflow for supporting ingestion and output of a content stream in another given format.

FIG. 15 illustrates an embodiment for supporting the Shoutcast format. Shoutcast is a protocol that is primarily used for audio live streaming over HTTP-like connections. To play a Shoutcast stream, the client makes an HTTP request and the HTTP response body is a continuous audio stream (i.e., unbounded response body). The audio stream is a mix of MP3 data (or AAC/OGG) and Shoutcast metadata. Shoutcast metadata typically contains song titles or artist info. While the Shoutcast protocol is similar to HTTP, it is not true HTTP because the protocol includes some non-standard HTTP request and response headers. As illustrated in FIG. 15, this embodiment comprises a Shoutcast EP 1500 to ingest Shoutcast-encoded streams. The TranformLib 1508 for Shoutcast library is provided to demux and mux MP3/AAC/OGG. TransformLib 1508 also parses Shoutcast URLs, rewrites them to the forward path, and generates BSI instructions. Because the client-player downloads a continuous unbounded HTTP response, the content server ghost process 1415 must turn fragmented forward origin requests into a single continuous client download. BSI instructs the ghost process on how to construct the client response from fragmented responses to forward requests. As shown in FIG. 15, the network architecture for Shoutcast support is similar to the iPhone support as provided in FIG. 14. The Shoutcast EP 1500 ingests the stream. The ingest server demuxes the stream using TransformLib 1508. It then sends the stream to ESM 1501. The ESM and SMT components remain the same. TransformLib 1515 on SMT 1512 parses Shoutcast URLs, creates BSI responses for Shoutcast, and muxes into Shoutcast output format.

Additional Performance Optimizations

For live streaming, some customer traffic may be prioritized based on factors such as service level agreements, priority of the event, etc. To increase the likelihood of a flawless stream delivery, per-customer quotas for how much a customer's stream should remain in memory cache may be set on a per-customer or per-stream configurable basis. By caching a stream in memory, disk reads for the live stream fragments are avoided. The quota can be time-based (e.g., last 5 minutes of a live stream) or size-based (e.g., 100 MB of live stream). When a customer quota is defined for a stream, the system attempts to maintain the stream in memory. Other streams without a quota are expired first from memory, preferably using an least-recently-used policy.

In this embodiment, when receiving a live stream from an encoder, the live stream fragments should be keep in-memory as long as possible without writing to disk. If the in-memory server buffer is full, the EP can write to disk, preferably using an least-recently-used policy. Also, requests to the EP for the live stream fragment preferably are served from the in-memory server buffer if possible. If the fragment is not in the in-memory buffer, EP can read from disk and serve back the response.

Binary Side Includes (BSI)

BSI is a name for functionality executable in a content server to generate output objects given an input object and certain instructions, typically instructions from another component such as the SMT component described above. The instructions typically define manipulations or actions to be performed on the input data. Such functionality is intended to enable modification of payloads as they are served to a requesting client, allowing a content server to easily provide, among other things, custom or semi-custom content given a generic object. In a typical but non-limiting embodiment, this functionality can be built into the HTTP proxy (ghost) application on the content server, although in alternative embodiments it can be implemented external to ghost.

Typically, many modifications made by the content server result in a minimal overall change to content, meaning that the resulting data served to the requesting client differs from the input by, for example, only a few percent. In one embodiment, a mechanism is defined for representing the difference (or "diff") between the source(s) and output content, allowing a generic feature in the content server to handle an increasing number of streaming formats in an efficient way.

In general, with BSI, components other than the content server are made responsible for defining or generating transforming logic and for providing instructions—along with binary "diff" information—that can be understood by the content server. By providing a mechanism for representing the difference (or "diff") between the source(s) and output content, and providing the content server with a way to use these to modify a generic source object, the client-facing content server may handle an increasing number of requests efficiently. Furthermore, depending on the circumstances, the inputs (e.g., the generic source object, instructions, etc.) may be cached. The output of the process also may be cached in some cases.

As noted previously, for convenience of illustration, in this disclosure this function is called BSI, for Binary-edge-Side Includes, or Binary Server Integration. The BSI language, with proposed syntax described below, defines different sources—incoming pieces of data that help construct the final output. Instructions (like 'combine' and others) define the byte ranges and order of how to merge these inputs, as well as controlling output headers. When generated in real-time, the BSI fragment and source object both can be cached (e.g., at the content server), placing far less load on the BSI generation tier than the content server would have handling them directly. For fixed/on-demand applications, the BSI may be generated once, and a BSI fragment cached (e.g., either on the content server, or on network storage or other dedicated storage subsystem such as is shown in FIGS. 5-6).

The BSI approach is ideally very fast. Preferably, the syntax is XML-based, and the number of instructions typically is kept very low, allowing fast parsing. The execution of BSI instructs the content server what order, and from which source, to fill an output buffer that is served to the client.

In the context of the previously-described streaming platforms, BSI functionality can be used between the SMT and content server to streamline the creation of an output object (e.g., an output object representing the stream in a native format for iPhone or other client device) from an input source (in the above cases, the IF fragments). The SMT receives IF fragments and performs muxing steps. Instead of muxed content as output, the SMT creates a dynamic BSI fragment that can be served to the content server, along with a binary object that contains the additional bits that the content server needs to combine with the IF fragment it normally receives. The content server uses this information to create the muxed output object in the native format, representing all or some portion of the stream.

Figure 16:
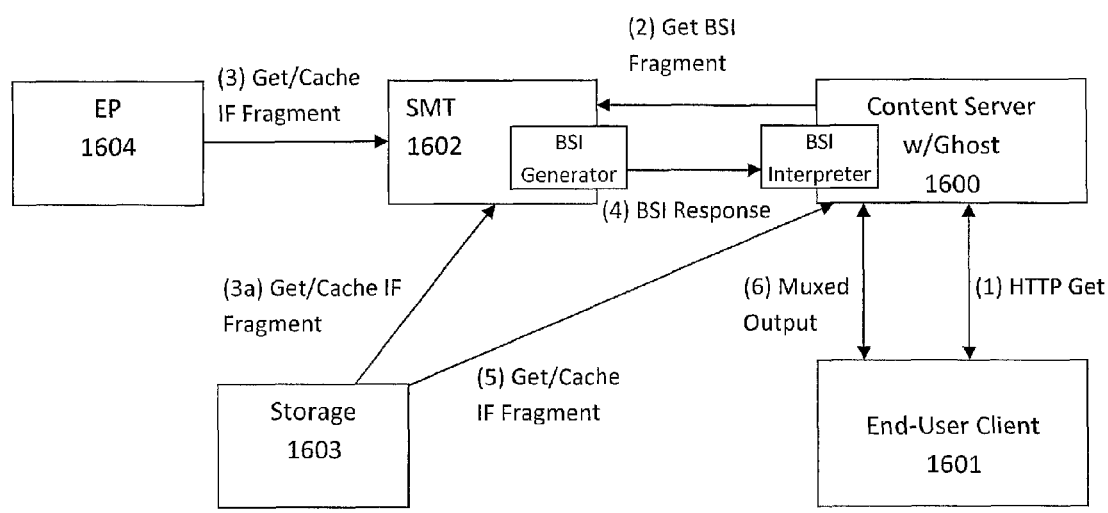
FIG. 16 illustrates one embodiment of a workflow using binary-side-includes to facilitate streaming.

Examples of using BSI for streaming are illustrated in previous FIGS., but FIG. 16 shows an embodiment of a workflow with additional detail. In this illustrative embodiment, the content server ghost process 1600 receives a request from a client player 1601 for particular content (step 1) in certain target format. The content server makes a request to a muxing tier (the SMT 1602) for the BSI instructions required (step 2). Typically, the request includes parameters via query string, to specify the type of request (manifest, content, key file, etc), the bitrate requested, a time determination (fragment no, time offset, etc.), and other parameters related to muxing (segment duration, A/V types, etc.). The SMT 1602 obtains the relevant IF fragments from the EP 1604 (step 3) or Storage 1603 (step 3a), builds an appropriate output object from the IF fragments as if it were to serve the content, creates a buffer of the bytes needed beyond what was contained in the IF fragments, along with instructions about how to 'interleave' or combine the binary diff with the IF. In some implementations, it should be understood, any necessary diff data may be embedded directly in the instructions themselves. In step 4, the SMT 1602 then sends the BSI response to the content server. The response may also include a reference to the IF fragments that are needed. The content server gets the IF fragments in any of variety of ways, including from the SMT (that is, in addition to the BSI), from its own cache, or from Storage 1603, which is typically a network storage subsystem that was previously described in connection with the streaming platform. Purely by way of example, step 5 in FIG. 16 shows the IF fragments arriving from Storage and being cached.

As the vast bulk of the data, which is represented by the IF fragment, is cached at the content server, the BSI response with its binary diff typically might be around a few percent of the overall size of the object to be served. The content server ghost 1600 applies the BSI, generating and serving a muxed output object to the client (step 6). The BSI response, including both the instructions and the diff data, can be cached by the content server ghost 1600 for some period of time. Preferably, the parameters supplied in the request to the SMT (step 2) are used in the cache key so that only subsequent requests for content with the same parameters utilize the cached BSI response. The output of the BSI operation need not be cached.

The foregoing approach can provide a variety of advantages. Because the BSI instructions can be used tell the content server ghost process how to mux or otherwise create the output object, BSI provides a way for the process to support any streaming container format without needing associated code changes at the content server ghost process. To handle new container formats or bug fixes to support existing container formats, BSI instructions can change, but the content server ghost process logic remains the same. This eliminates any cross-component dependency with the content server or its ghost process when developing or implementing new streaming features.

Further, for streaming to client devices using different container formats, BSI can reduce the ghost cache footprint size because the ghost process caches the IF fragments but muxes the IF into different native formats. Preferably, the muxed output is not cached; rather, only the IF fragment is cached. For example, the system can be used to stream Adobe Zeri (HTTP Streaming for Flash) to Android devices running Flash 10.1 and stream to MPEG2-TS to iPhone devices. For the live stream, only the IF fragment is cached and the content server muxes into Zeri for Android devices and muxes into MPEG2-TS for IPhone devices. These are just representative examples.

For streaming of progressive-download-style formats (like Shoutcast), data is streamed to client as a long-running unbound HTTP download. From the end user client perspective, it is downloading a file that never ends. BSI functionality can be used for progressive-download-style formats and, in particular, to mux fragment responses from the origin (e.g., a content provider origin or CDN storage subsystem) into a continuous HTTP download stream for the client. Using metadata applied by the content server ghost process (configurable by content provider) and progressive-download-style BSI from the SMT, BSI can also be used to implement progressive-download-specific features, like jump-to-live-on-drift and delayed metadata injection based on user-agent. Specific progressive-download-style requirements thus can be inherently supported through BSI without requiring any changes in the content server.

Fragmented streaming formats (like Zeri, iPhone, and Silverlight) may also use BSI functionality. For example, the SMT can send the content server content in a native format or a BSI fragment that the content server ghost process muxes into the native format. If a CDN content provider customer is only doing streaming for a single container format, there is no need to cache IF fragments and mux on the content server ghost process via BSI. In such case, it is more efficient for SMT to return the native object, which the content server ghost process caches. Enabling or disabling using BSI is configurable, preferably on a content provider by content provider basis, and, for a given content provider, on a site by site basis, or even a file by file basis.

For convenience of illustration, the discussion below refers to a BSI language and provides various examples of BSI instructions; however, the particular language, instructions, and functions discussed herein should be viewed as illustrative and not as limiting.

BSI Language

In one embodiment, the syntax is in XML, which can be advantageous for easy parsing and compatibility with other content server functionality (e.g., control file metadata which may also be implemented in XML).

Source

BSI accepts a definition of one or more sources. Subsequent actions refer to a source id.

| Tag | Type | Description |
| --- | --- | --- |
| bsi:source | Element | Defines a source for later reference by actions. Sample Tag: <bsi:source id="a" type="remote" target="http://origin/path/resource"/> |
| bsi:source.id | Attribute, String | Sets the ID used to reference this source. Preferably starts with a letter, is not case sensitive, and should typically be short (one letter typically). Proposed pattern ^[a-zA-Z][a-zA-Z0-9_]{0-9}$. Preferably there is a way to indicate current buffer as a source, which could be a special/reserved character, or simply by omitting the id. |
| bsi:source.type | Attribute, Enum | Sets the type to one of the following. Remote: a URL to go forward to (as needed by ranges) as a source. Local: A binary blob appended to the BSI response. Offset defined by a header in this case. Inline: The source is binary data that is defined directly in this tag. This could be limited to Base64 or it could be implemented as a format field to define |

| Tag | Type | Description |
| --- | --- | --- |
| | | Ascii, base64, hex, etc. In this case the test that defines the source is included in the body of the source tag. |

Actions

Next are actions, which here refer to defined sources by id and instruct on how to order bytes from different sources to build the output that is served. Actions are best structured to make them easy to parse and as succinct as possible. The interpreter is able to parse all needed actions, and to sort them by order of use as the output buffer is created. This keeps the amount of buffered data at a minimum, and it allows short circuiting processing at any point if the client disconnects or an error is encountered.

When possible, use of instructions like combine should be used, as it allows the compiler/interpreter to easily determine the exact order of bytes for the entire output object, serving it without an intermediate buffer.

| Tag | Type | Description |
| --- | --- | --- |
| bsi:combine | Element, list | Defines a list of ranges to include from sources. It defines a list of elements with syntax [Source_ID] : [Byte_Offset] : [Length]. Each element in the list is added to the end of the current buffer. Specifying offset + length, rather than a range, to be more concise. Could also allow exclusion of Source_ID, in which case the previous source is assumed. Byte offsets or lengths can be expressed in decimal or HEX (must begin with 0x or x, more concise for large values), and should handle up to 64 bit integer values (or at *least* 48 bit unsigned). A value of '*' for length would indicate until the end of the source. Sample tag (mix and match ranges from 3 sources): <bsi:combine>[ b:0:0x128, a:68:90, a:92:65043, b:0x124:0x26, c:0:* ]</bsi:combine> |
| bsi:insert | Element | Specifies a list of elements, each one pulling a range from a source and inserting it at an offset into the current buffer - shifting the current buffer to accommodate. It defines a list of elements with syntax: [Source_ID] : [Source_Offset] : [Length] : [Dest_Offset]. If a buffer does not already exist, the Dest_offset must be 0. The length can be * to indicate the remainder of the source, and the dest_offset can be *, indicating that the data is appended to the end of the current buffer. Sample tag (fill buffer with 'a', then insert sections of 'b'): <bsi:insert>[ a:0:*:0, b:0:64:128, b:64:*:*]</bsi:insert> |
| bsi:substitute | Element, list | Similar to Insert, but substitute overwrites the buffer, rather than shifting it. This action works upon the current buffer, and thus requires a buffer to already be built through use of bsi:combine or bsi:insert. It defines a list of elements with syntax: [Source_ID] : [Source_Offset] : [Length] : [Dest_Offset]. Each element defines a byte range to be taken from a source, and overlaid upon a buffer at a certain position—replacing a number of bytes equal to the length. If the length exceeds the current (planned) buffer, then the command would further increase the virtual buffer to be served. The length can be *, indicating the remainder of the source. Sample tag (overwrite portions of buffer with ranges of 'b'): <bsi:substitute>[ b:0:0x128:0x578, b:0x124:0x26:0x2048 ]</bsi:substitute> |
| bsi:remove | Element | Specifies a list of elements, each one removing a range from the current virtual buffer. It defines a list of elements with syntax: [Dest_Offset] : [Length]. The length can be * to indicate the remainder of the dest, and the dest_offset can be negative, indicating to go from the end of the file. Sample tag (remove a few bytes in the middle and then truncate buffer at 256 bytes): <bsi:remove>[ 128:2, 256:* ]</bsi:remove> |

The Insert instruction provides a way to apply a function to a group of bytes that have already been assigned to the output buffer. For example, the instruction might be needed to apply a cipher or hash to bytes that are contiguous in the output, but not in our sources, so a function during an initial combine operation is not useful. One way would be to allow operations to pull from the output buffer, as indicated by a source of *. An optional dest-length parameter on this operation may also be implemented, which would allow writing the result into the same block, but shift the bytes if needed. This would be useful for ciphers that might pad the data. (Because function is already an optional item, it may be needed to distinguish a function, e.g., by prepending $).

```
1.   <!--combine a couple sources.. -->
2.   <bsi:combine>[ b:0:0x128, a:68:90, a:92:65043,
     b:0x124:0x23 ]</bsi:combine>
3.   <!--and then apply a function to a sequence in the output buffer -->
4.   <bsi:insert>[ *:96:64:96:64:$enc ]</bsi:insert>
```

Non-Action Commands

These are commands that, unlike actions, do not directly act upon the output buffer.

| Tag | Type | Description |
| --- | --- | --- |
| bsi:set | Element | Sets a value to a target, apart from the output buffer. Sample tag (mix and match ranges from 3 sources): <bsi:combine>[ b:0:0x128, a:68:90, a:92:65043, b:0x124:0x26, c:0:* ] </bsi:combine> |
| bsi:set.target | Attribute, String | Possible values include 'Header' or 'Response Code'. |
| bsi:set.name | Attribute, String | In the case of set target="header", the name of the header to set. |
| bsi:set.value | Attribute, String | The value to set |
| bsi:validate | Element | Provides validation values to compare the output with. Could be useful in some cases, but would likely require buffering the whole file before serving (or else validating only for the purposes of the log) and so may not be efficient in many cases. Sample tag: <bsi:validate length="67373" md5= "d8e8fca2dc0f896fd7cb4cb0031ba249" /> |
| bsi:validate.length | Attribute, Int | Ensure the content length is as-expected before serving |
| bsi:validate.md5 | Attribute, md5 hash | Ensure the buffer md5 matches what is expected before serving. |

Transform Functions

Transforms define functions that can be applied to byte ranges as they are used in other commands.

| Tag | Type | Description |
| --- | --- | --- |
| bsi:transform | Element | Assigns a transform to an ID for later use in actions or upon sources. Sample tag: <bsi:transform id="aes_enc" type="ENC_AES128CBC" parameters="key=123,iv=456" /> |
| bsi:transform.id | Attribute, String | Same rules as IDs for sources, used to later refer to this transform. Sample pattern ^[a-zA-Z][a-zA-Z0-9_]{0-9}$ |
| bsi:transform.type | Attribute, Enum | Selects the supported transform to use. Possibilities include: Encryption/decryption with ciphers such as AES, 3DES, RC4 Encoding/decoding with formats base64, url encoding, string encoding (ascii/utf8, etc) Compression; zip, etc. Hash functions; md5, sha1, sha256, CRC, etc. Math functions |
| bsi:transform.parameters | Attribute, String | A list of key/value pairs of parameters as needed by the selected transform, like keys for encryption, etc. |

Other

To support certain use cases, it may be desired to allow metadata variables to be placed in the code. At runtime, ghost substitutes these with variables in metadata context. Conditional logic is also important for several uses, but it may impact the very streamlined and easy-to-interpret language described above. To address this, an 'enabled' attribute may be added to each statement, with that attribute then being controlled with ARL metadata variables. The following shows this being used as a sort of IF/ELSE, depending on how the variable % (TEST) evaluates.

```
1.  <!--Do this if 'TEST' evals as true -->
2.  <bsi:combine enabled="%(TEST)" >[ b:0:128, a:68:90,
    a:92:65043 ]</bsi:combine>
3.  <!--Otherwise, do this instead. -->
4.  <bsi:combine enabled="!%(TEST)" >[ b:129:1024,
    a:68024:2048, b:1153:64, c:0:*]</bsi:combine>
```

In this example, the value of enabled would be evaluated as boolean, accepting 0/1 or true/false, and would also allow '!' to indicate 'NOT'. The metadata variable replacement is done prior to parsing the BSI statements; preferably, any caching of BSI fragments need not include the variable replacements.

Variants

For insert and substitute, there may be an optional syntax that allows the same source data to be injected at multiple points in the destination. Another optimization is a notation that indicates the pattern at which to insert given data, such as:

<bsi:insert>[a:0:*:0, b:0:64:214(128:10) . . . ]</bsi:insert>

In this example, where starting at offset 214, the section of bytes from source b is inserted every 128 bytes, for 10 iterations, and so forth. Such encoding would reduce the size and redundancy in a BSI fragment for certain types of transforms. Or, instead of a mathematical component, the interpreter may operate to simply cause storage of full headers in the diff, but have a repeating statement that has two offsets, which would be very fast. For example, assume the fragment starts at byte 64 of source B, taking 14 bytes for the packet header, and repeats every 14 bytes 200 times, essentially storing each header one after another in the diff. Then, on the destination side place those bytes every 188 bytes-for 200 iterations. This syntax is as follows:

<bsi:insert>[a:0:*:0, b:64:14(14:200):214(188:200)]</bsi:insert>

For long running connections, particularly for live media, it may be useful to chain BSI fragments together. A statement at the end of the fragment could instruct ghost the next fragment in the series, which could be retrieved as needed. This would allow a component (e.g., a muxer) to generate a BSI fragment that handles the buffer currently available, and then tell ghost what fragment to use next-likely a time parameter.

<bsi:continue fragment="http://origin/fragment.bsi?time=12345"/>

Example for Muxing Application in Streaming Platform

Here is an example for muxing that shows the usage of BSI tags:

```
1.  <!--assign a source from a remote file that ghost will fetch,
in this case IF. -->
2.  <bsi:source id="a" type="remote"
target="http://origin/IF_Fragment(time=%(TIME),
bitrate=%(BITRAT E))" />
3.  <!--assign a source from 'local', meaning the binary
that is appended to this response -->
4.  <!--a header could tell ghost where the XML response ends, and
binary begins, for efficiency-->
5.  <bsi:source id="b" type="local" />
6.  <!--Though not as efficient you could assign a source from
inline data, say in base64 -->
7.  <bsi:source id="c" type="inline"
>bGxvdy11cCAoc29tZSBhbWJpZ3VpdHkgaGVyZSB3ZSBuZWVkIH
RvIGNsZWFu=</bsi:source>
8.  <!--combine the two sources, by providing a collection with
source id : byte offset : length -->
9.  <bsi:combine>[b:0:128, a:68:90, a:92:65043, b:129:1024,
a:68024:2048, b:1153:64, c:0:*]</bsi:combine >
10. <!--optional validate tag would enforce that the content-length
and hash of output are as expected -->
11. <bsi:validate length="67373"
md5="d8e8fca2dc0f896fd7cb4cb0031ba249" />
12. <!--This kind of thing is done as a function in edge-side-includes,
rather than a first class tag. -->
13. <bsi:set target="header" name="Content-Type"
value="video/flv" />
14. <bsi:set target="header" name="Content-Length"
value="2147483647" />
```

In some use cases like muxing, the BSI and replacement data can be generated dynamically, so the techniques herein also allow the data to be appended to the BSI fragment to prevent needing another roundtrip request. Thus, for example, a header could indicate that a particular binary blob is appended to the BSI code, for easier parsing by ghost:

X-BSI-Data: bytes 126-4234\r\n

Computer Based Implementation

The clients, servers, and other devices described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more processors to provide a special purpose machine. The code may be executed using conventional apparatus—such as a processor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 17:
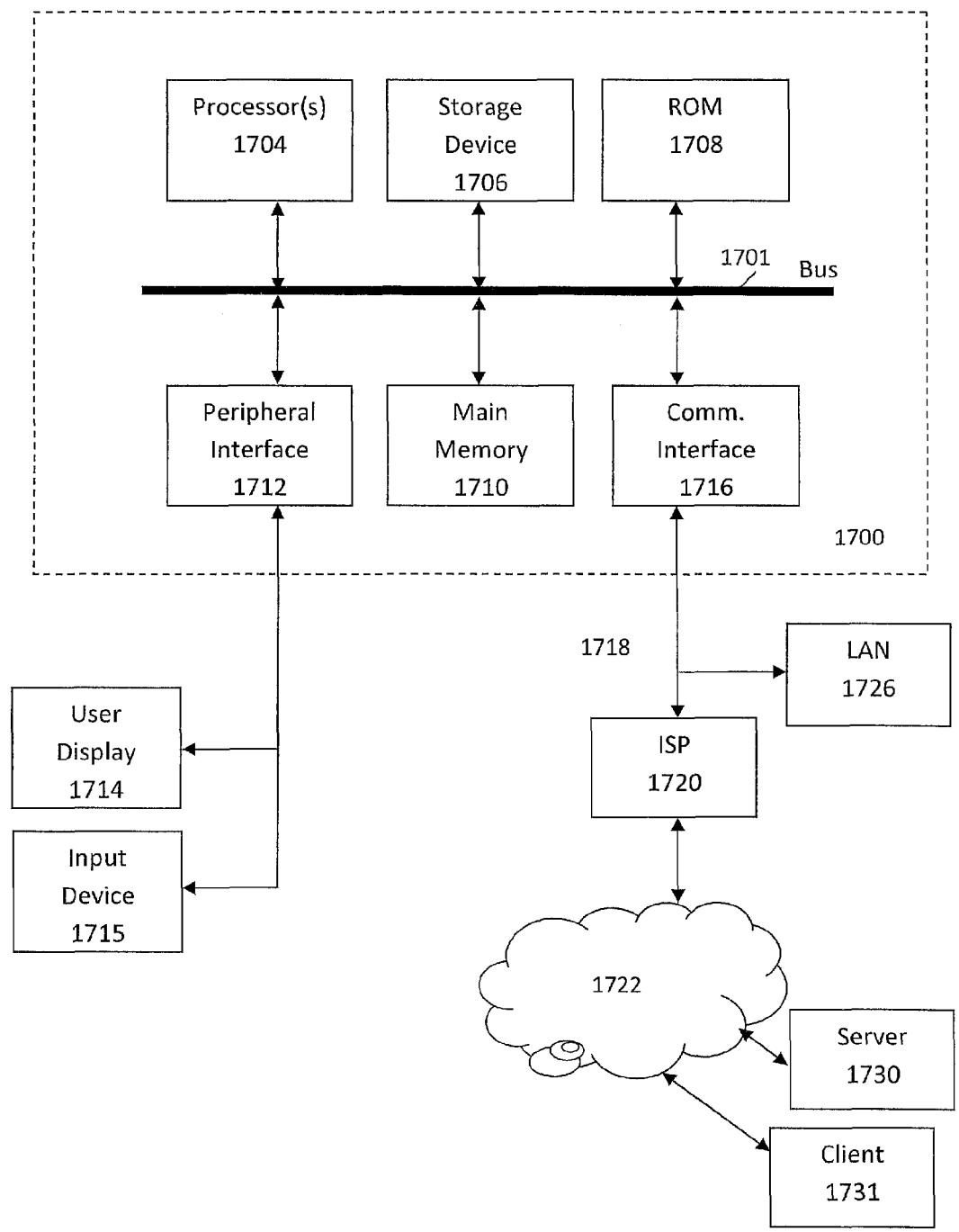
FIG. 17 is a block diagram that illustrates hardware in a computer system which may be used to implement the teachings hereof.

FIG. 17 is a block diagram that illustrates hardware in a computer system 1700 upon which such software may run in order to implement embodiments of the invention. The computer system 1700 may be embodied in a client device, server, personal computer, workstation, tablet computer, wireless device, mobile device, network device, router, hub, gateway, or other device. Representative machines on which the subject matter herein is provided may be Intel Pentium-based computers running a Linux or Linux-variant operating system and one or more applications to carry out the described functionality.

Computer system 1700 includes a processor 1704 coupled to bus 1701. In some systems, multiple processor and/or processor cores may be employed. Computer system 1700 further includes a main memory 1710, such as a random access memory (RAM) or other storage device, coupled to the bus 1701 for storing information and instructions to be executed by processor 1704. A read only memory (ROM) 1708 is coupled to the bus 1701 for storing information and instructions for processor 1704. A non-volatile storage device 1706, such as a magnetic disk, solid state memory (e.g., flash memory), or optical disk, is provided and coupled to bus 1701 for storing information and instructions. Other application-specific integrated circuits (ASICs), field programmable gate arrays (FPGAs) or circuitry may be included in the computer system 1700 to perform functions described herein.

A peripheral interface 1712 communicatively couples computer system 1700 to a user display 1714 that displays the output of software executing on the computer system, and an input device 1715 (e.g., a keyboard, mouse, trackpad, touchscreen) that communicates user input and instructions to the computer system 1700. The peripheral interface 1712 may include interface circuitry, control and/or level-shifting logic for local buses such as RS-485, Universal Serial Bus (USB), IEEE 1394, or other communication links.

Computer system 1700 is coupled to a communication interface 1717 that provides a link (e.g., at a physical layer, data link layer, or otherwise) between the system bus 1701 and an external communication link. The communication interface 1716 provides a network link 1718. The communication interface 1716 may represent a Ethernet or other network interface card (NIC), a wireless interface, modem, an optical interface, or other kind of input/output interface.

Network link 1718 provides data communication through one or more networks to other devices. Such devices include other computer systems that are part of a local area network (LAN) 1726. Furthermore, the network link 1718 provides a link, via an internet service provider (ISP) 1720, to the Internet 1722. In turn, the Internet 1722 may provide a link to other computing systems such as a remote server 1730 and/or a remote client 1731. Network link 1718 and such networks may transmit data using packet-switched, circuit-switched, or other data-transmission approaches.

In operation, the computer system 1700 may implement the functionality described herein as a result of the processor executing code. Such code may be read from or provided by a non-transitory computer-readable medium, such as memory 1710, ROM 1708, or storage device 1706. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 1718 (e.g., following storage in an interface buffer, local memory, or other circuitry).

It is noted that trademarks appearing herein are the property of their respective owners and used for identification and descriptive purposes only, given the nature of the subject matter at issue, and not to imply endorsement or affiliation in any way.

Pursuant to 37 CFR 1.96(b)(2), a computer program listing illustrating an example of a BSI interpreter is included below:

```python
#!/usr/bin/env python
# encoding: utf-8
"""
bsi.py : Binary Server Includes (BSI) Interpreter
Copyright (c) 2011 Akamai Technologies. All rights reserved.
"""
import sys, os
import getopt
import xml.sax
import xml.sax.handler
import httplib
import argparse
args = None
class Usage(Exception):
    def __init__(self, msg):
        self.msg = msg
class ErrorHandler:
    def __init__(self, parser):
        self.parser = parser
    def fatalError(self, msg):
        print msg
class Instruction(object):
    def __init__(self, source, start, length):
        self.source = source.strip( )
        self.start = int(start)
        self.length = int(length)
    def __repr__(self):
        return self.source + " " + str(self.start) + "-" + str(self.length)
class Source(object):
    target = None
    file = None
    data = None
    def __init__(self, id, type="remote", target=None):
        self.type = type
        self.id = id
        self.target=target
    def __repr__(self):
        return self.type + ": " + str(self.target) + ", " + str(self.file)
class BsiHandler(xml.sax.handler.ContentHandler):
    def __init__(self):
        self.inCombine = 0
        self.inSource = 0
        self.inOther = 0
        self.instructions = [ ]
        self.sources = { }
        self.compile = "."
    def startElement(self, name, attributes):
        #print name + "!"
        if (args.verbose):
            print name,
            for a in attributes.keys( ):
                print ", " + a + "=" + attributes[a].rstrip( ),
            print ""
        self.inOther = 1
        if name == "source":
            self.inSource = 1
            self.inOther = 0
            self.currentSource = Source(attributes["id"], attributes["type"], attributes["target"])
            self.sources[attributes["id"]] = self.currentSource
        if name == "combine":
            self.inCombine = 1
            self.inOther = 0
        else:
            #print (str(self) + ", " + str(name) + ", " + str(attributes), " comp: " + str(self.compile))
            if(self.compile != None):
                if (name=="bsi"):
                    self.compile.write("<bsi")
```

```
                else:
                    self.compile.write(" <" + name)#+ ">")
                if len(attributes) > 0:
                    for a in attributes.items( ):
                        self.compile.write(" " + a[0] + "=\"" + a[1] + "\"");
    def characters(self, data):
        if self.inCombine:
            elements = data[1:-1].split(',')
            for element in elements:
                esplit = element.split(':')
                inst = Instruction( esplit[0], esplit[1], esplit[2] )
                self.instructions.append(inst)
        elif self.inSource:
            self.currentSource.data = data
            if(self.compile != None):
                if(data == None or len(data)==0):
                    self.compile.write(" />")
                else:
                    self.compile.write(">")
                    self.compile.write(data)
        elif self.inOther:
            self.compile.write(">\n")
            self.inOther = 0
    def endElement(self, name):
        if self.inCombine :
            self.inCombine = 0
        elif self.inSource:
            self.inSource = 0
            if(self.compile != None):
                if(self.currentSource.data == None):
                    self.compile.write(" />\n")
                else:
                    self.compile.write("</" + name + ">\n")
        elif (name != "bsi"):
            if(self.compile != None):
                self.compile.write("</" + name + ">\n")
        #else:
            #if self.inCombine:
def parse (in_file, comp_file):
    if(in_file is httplib.HTTPConnection):
        in_file.request("GET", "in_file")
        r1 = in_file.getresponse( )
        if (args.verbose):
            print r1.status, r1.reason
        data = r1.read( )
        temp.write(data)
        in_file.close( )
        in_file = temp
    if (args.verbose):
        print "Parsing: " + str(in_file)
    parser = xml.sax.make_parser( )
    handler = BsiHandler( )
    handler.compile = comp_file
    parser.setContentHandler(handler)
    parser.setErrorHandler(ErrorHandler(parser))
    parser.parse(in_file)
    return handler.instructions, handler.sources
def get_file(in_file, arg='r'):
    if(arg=='r' and (in_file == "" or in_file==None)):
        return sys.stdin
    try:
        if(in_file.startswith("http") and arg=='r'):
            print "http"
            return httplib.HTTPConnection(in_file)
        else:
            fname = os.path.abspath(in_file)
            if (args.verbose):
                print "File: " + str(fname) + " " + arg
            return open(fname, arg)
    except:
        print "Error opening " + in_file + ", " + str(sys.exc_info( )[0])
        return None
def execute (instructions, sources, output, comp_file):
    for source in sources.values( ):
        if(source.target.startswith("http")):
            source.file = httplib.HTTPConnection(sources[source])
        else:
            f = os.path.abspath(source.target)
            source.file = open(f, 'rb')
    if (output==None or output==""):
        output = sys.stdout
    else:
        output = open(output, 'r+b')
    if (args.verbose):
        for inst in instructions:
            print str(inst) + ",",
        print '\n-----------------------------------'
    if(comp_file != None):
        comp_file.write(" <combine>")
        first = True
    for inst in instructions:
        #get data for this inst.
        data = getData(sources[inst.source].file,inst.start,inst.length)
        #write data to output
        output.write(data)
        if (comp_file):
            if (not first): comp_file.write(",")
            comp_file.write(str(inst.source)
+":"+str(inst.start)+":"+str(inst.length))
            first = False
    if(comp_file != None):
        comp_file.write("</combine>\n</bsi>\n")
        comp_file.close( )
    #close input/output files
    for s in sources.values( ):
        s.file.close( )
    output.close( )
def getData(inp,start,length):
    data = None
    if (inp is httplib.HTTPConnection):
        inp.request("GET", "in_file")
        inp.putheader("Range", str(start) + "-" + str(start + length) + " bytes")
        inp.endheaders( )
        r1 = inp.getresponse( )
        print r1.status, r1.reason
        data = r1.read( )
    else:
        inp.seek(start)
        data = inp.read(length)
    return data
def get_args(argv):
    if argv is None:
        argv = sys.argv
    try:
        parser = argparse.ArgumentParser( )
        parser.add_argument("-i", "--in_file', dest="in_file", help="Input BSI file to process")
        parser.add_argument("-o", "--output', dest="output", help="Output results to file (rather than std_out)")
        parser.add_argument("-c", "--compile', dest="compile", help="Output optimal BSI")
        parser.add_argument("-v", "--verbose", action="store_true", dest="verbose", default=False, help="print status messages to stdout")
        args = parser.parse_args( );
        if (args.verbose): print "Args: " + str(args)
        return args
    except Usage, err:
        print >> sys.stderr, sys.argv[0].split("/")[-1] + ": " + str(err.msg)
        print >> sys.stderr, "\t for help use --help"
        return None
def main(argv=None):
    #get command arguments
    global args
    args = get_args(argv)
    #set up output compiled file
    comp_file = get_file(args.compile, "w")
    #set up input BSI file
    bsi = get_file(args.in_file)
    #parse bsi, compiling instructions and resolving source lisrt
    instructions, sources = parse (bsi, comp_file)
    #execute instructions
```

-continued

```
    execute (instructions, sources, args.output, comp_file)
if ___name___ == "___main___":
    sys.exit(main( ))
```

We claim:

1. A system for online delivery of streaming content, comprising:
   a plurality of machines interconnected via the Internet, each machine comprising circuitry forming at least one processor, and computer memory holding computer program code to be executed by the at least one processor to facilitate delivery of a stream to a client that requests the stream in a target format, the stream originating in a source format;
   the plurality of machines including:
   a first machine that serves the stream in an intermediate format, which is a format for transporting the stream amongst the plurality of machines, the stream having been converted from the source format to the intermediate format;
   a second machine that receives the stream in the intermediate format from the first machine and generates instructions for use by a third machine specifying how the third machine is to create an output object for the stream in the target format, the instructions comprising container format headers for the target format and at least one intermediate format fragment request with at least one URL including a parameter qualifying the at least one URL as pointing directly to encoded, compressed audio and video data for the stream, without intermediate format container headers;
   the third machine operable to:
   (a) receive from the second machine the instructions specifying how the third machine is to create the output object for the stream in the target format wherein said receiving includes receiving the container format headers for the target format and the at least one intermediate format fragment request with the at least one URL;
   (b) request the audio and video data at the at least one URL, and receive the audio and video data in response thereto;
   (c) apply the instructions to create the output object for the stream in the target format from the container format headers and the audio and video data; and,
   (d) serve the output object for the stream in the target format to the client;
   wherein the intermediate format and the target format each comprise container formats.

2. The system of claim 1, wherein the stream is a live stream.

3. The system of claim 2, wherein the first machine receives the live stream in the source format from an encoder, and converts the live stream from the source format to the intermediate format.

4. The system of claim 2, wherein the first machine receives the live stream from an encoder, and passes the live stream to a transform library component for demuxing into the intermediate format, and provides an entry point stream manager that receives the demuxed live stream, sets up and manages a live stream publishing point and serves current portions of the live stream in the intermediate format in response to requests from the second machine.

5. The system of claim 2, wherein the source and target formats are different.

6. The system of claim 2, wherein the source and target formats are the same.

7. The system of claim 2, wherein the third machine comprises a proxy server that receives a request from the client for the live stream.

8. The system of claim 2, wherein the second machine comprises a first process and a second process, the first process receiving incoming requests from the third machine and forwarding those requests to the second process, the second process forwarding the requests to a transform library function that generates the instructions for use in converting the live stream into the target format.

9. The system of claim 2, wherein the plurality of interconnected machines includes a fourth machine that stores an archive of the live stream for DVR or VOD playback, and that stores stream metadata.

10. The system of claim 9, wherein the first machine archives the live stream to the fourth machine as current live stream fragments in the intermediate format are being served from the first machine to the second machine.

11. A method performed by a plurality of content servers interconnected via the Internet, the method facilitating online delivery of streaming content to a client that requests the stream in a target format, the stream originating in a source format, the method comprising:
   (A) serving a stream in an intermediate format, which is a format for transporting the stream amongst the plurality of content servers, the stream having been converted from a source format to the intermediate format;
   (B) at a given content server, receiving the stream in the intermediate format, and generating instructions for use by another content server specifying how the another content server is to create an output object for the stream in the target format, the instructions comprising container format headers for the target format and at least one intermediate format fragment request with at least one URL including a parameter qualifying the at least one URL as pointing directly to encoded, compressed audio and video data for the stream, without intermediate format container headers;
   (C) receiving, at the another content server, the stream and the instructions specifying how the another content server is to create the output object for the stream in the target format wherein said receiving includes receiving the container format headers for the target format and the at least one intermediate format fragment request with the at least one URL;
   (D) at the another content server, requesting the audio and video data at the at least one URL, and receive the audio and video data in response thereto, and applying the instructions to create the output object for the stream in the target format from the container format headers and the audio and video data; and,
   (E) at the another content server, serving the output object for the stream in the target format to a client;
   (F) wherein the intermediate format and the target format each comprise container formats.

12. The method of claim 11, wherein the stream is a live stream.

13. The method of claim 12, further comprising, prior to step (A):
   receiving the live stream in the source format from an encoder, and converting the live stream from the source format to the intermediate format.

14. The method of claim 12, wherein the source and target formats are different.

15. The method of claim 12, wherein the source and target formats are the same.

16. The method of claim 12, wherein the another server is a proxy server that received a request from the client for the live stream.

17. The method of claim 12, further comprising archiving the live stream for DVR or VOD playback.

18. The method of claim 17, wherein said archiving occurs as current live stream fragments in the intermediate format are being served in step (A).

19. Computer apparatus for online delivery of streaming content, comprising:
   two or more computers interconnected via the Internet and collectively comprising (i) circuitry forming a plurality of processors and (ii) computer memories holding computer program code to be executed by the plurality of processors to create a special purpose machine that facilitates delivery of a stream to a client that requests the stream in a target format, the stream originating in a source format;
   wherein the code, when executed, causes the computer apparatus to perform the following operations:
   (A) serving the stream in an intermediate format, which is a format for transporting the stream amongst the two or more computers, the stream having been converted from a source format to the intermediate format;
   (B) at a given computer, receiving the stream in the intermediate format, and generating instructions for use by another computer specifying how the another computer is to create an output object for the stream in the target format, the instructions comprising container format headers for the target format and at least one intermediate format fragment request with at least one URL including a parameter qualifying the at least one URL as pointing directly to encoded, compressed audio and video data for the stream, without intermediate format container headers;
   (C) receiving, at the another computer, the stream and the instructions specifying how the another computer is to create the output object for the stream in the target format, wherein said receiving includes receiving the container format headers for the target format and the at least one intermediate format fragment request with the at least one URL;
   (D) at the another computer, requesting the audio and video data at the at least one URL, and receiving the audio and video data in response thereto, and applying the instructions to create the output object for the stream in the target format from the container format headers and the audio and video data; and,
   (E) at the another computer, serving the output object for the stream in the target format to the client;
   (F) wherein the intermediate format and the target format each comprise container formats.

20. The apparatus of claim 19, wherein the stream is a live stream.

21. The apparatus of claim 20, further comprising, prior to step (A): receiving the live stream in the source format from an encoder, and converting the live stream from the source format to the intermediate format.

22. The apparatus of claim 20, wherein the source and target formats are different.

23. The apparatus of claim 20, wherein the source and target formats are the same.

24. The apparatus of claim 20, wherein with the another computer is a proxy server that received a request from the client for the live stream.

* * * * *